United States Patent [19]
Fulbright et al.

[11] Patent Number: 5,604,968
[45] Date of Patent: Feb. 25, 1997

[54] FASTENER SYSTEM INCLUDING A SWAGE FASTENER AND TOOL FOR INSTALLING SAME

[75] Inventors: David J. Fulbright; Walter J. Smith, both of Waco, Tex.

[73] Assignee: Huck Patents, Inc., Wilmington, Del.

[21] Appl. No.: 479,046

[22] Filed: Jun. 6, 1995

Related U.S. Application Data

[62] Division of Ser. No. 189,871, Feb. 1, 1994, Pat. No. 5,548,889, which is a continuation of Ser. No. 765,399, Sep. 24, 1991, Pat. No. 5,315,755, which is a continuation of Ser. No. 654,412, Feb. 11, 1991, abandoned, which is a continuation of Ser. No. 359,482, May 31, 1989, abandoned.

[51] Int. Cl.$^6$ .............. B23Q 17/00; B23P 11/00
[52] U.S. Cl. ............. 29/407.05; 29/407.03; 29/525.02; 29/525.05
[58] Field of Search ............ 29/709, 714, 715, 29/456, 517, 520, 407.03, 407.05, 525.02, 525.05, 407.01; 411/277, 278, 361, 925, 937.2

[56] References Cited

U.S. PATENT DOCUMENTS

| | | |
|---|---|---|
| 2,789,619 | 4/1957 | Wing et al. |
| 2,955,505 | 10/1960 | Schuster. |
| 3,204,331 | 9/1965 | Looker .................. 29/525.05 X |
| 4,176,436 | 12/1979 | McCombs et al. .......... 29/407.03 X |
| 4,299,519 | 11/1981 | Corbett. |
| 4,813,834 | 3/1989 | Smith. |
| 4,867,625 | 9/1989 | Dixon. |

*Primary Examiner*—Joseph Gorsici
*Attorney, Agent, or Firm*—Harness, Dickey & Pierce P.L.C.

[57] ABSTRACT

A fastener system for multi-piece swage type fasteners, including a pin and a collar, and providing a stump type fastener constructed to be set as a pull type fastener with the fastener pin having a threaded gripping portion and including an installation tool having a swage anvil and a rotary nut member adapted to be threaded onto the threaded pull portion of the pin whereby a relative axial force is applied between the pin and the collar via the nut member and swage anvil to cause the anvil to radially overengage the collar to swage it into locking grooves on the pin and the pull portion remaining on the pin after installation.

18 Claims, 9 Drawing Sheets

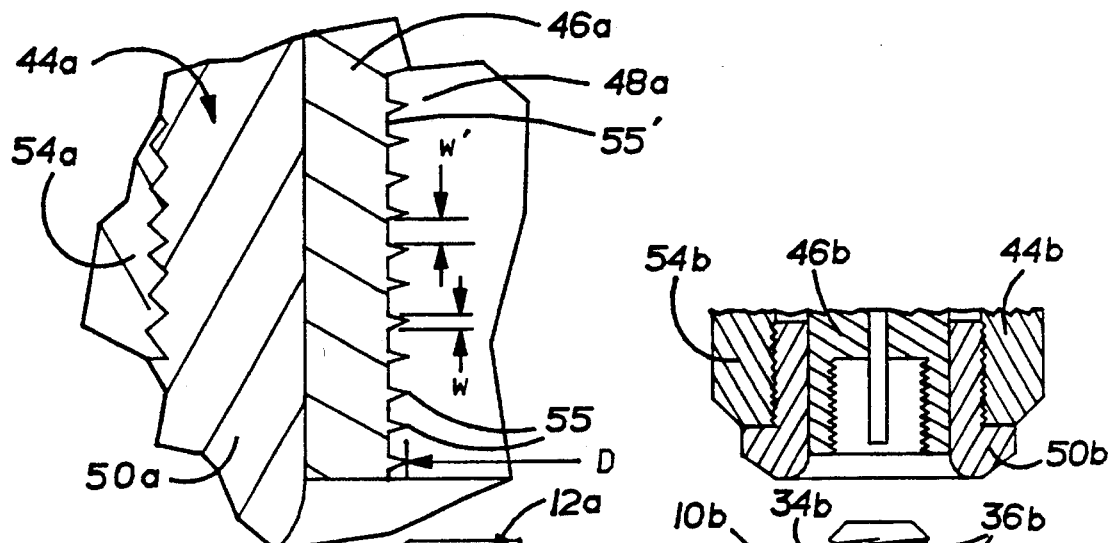
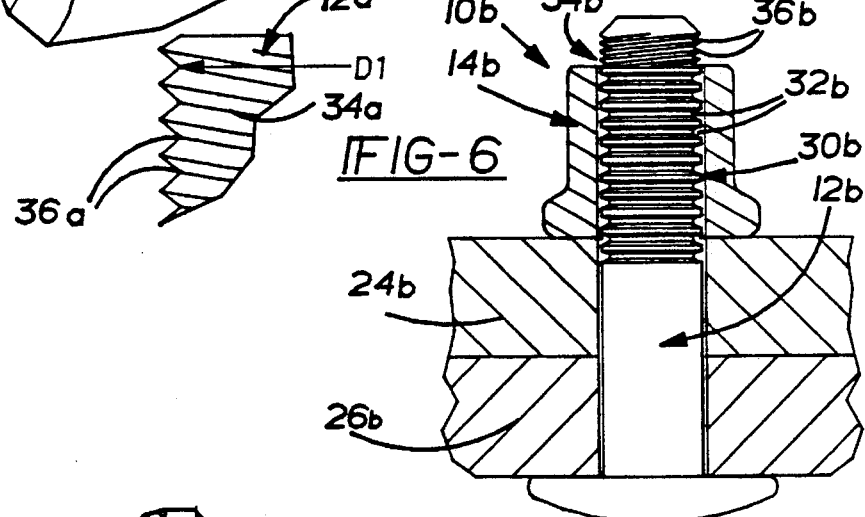
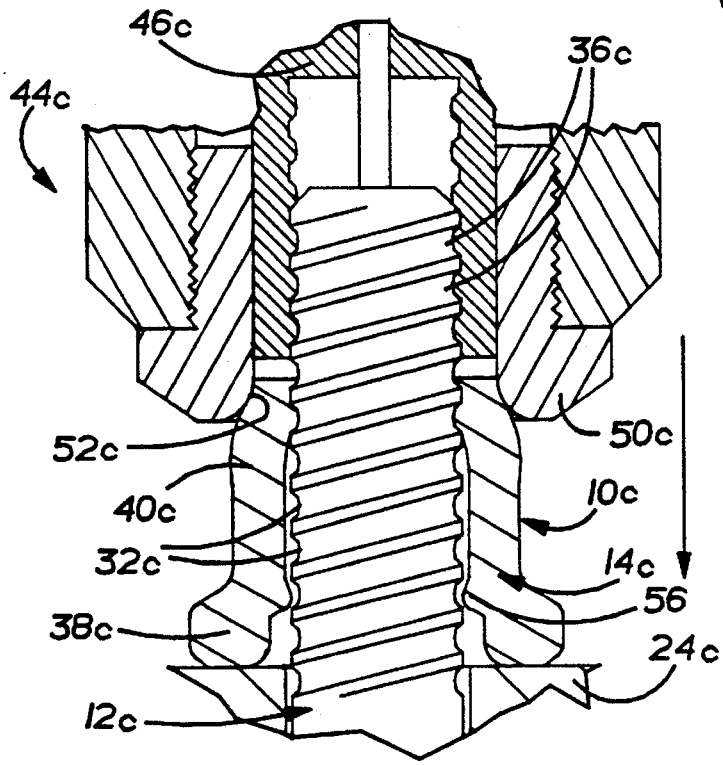

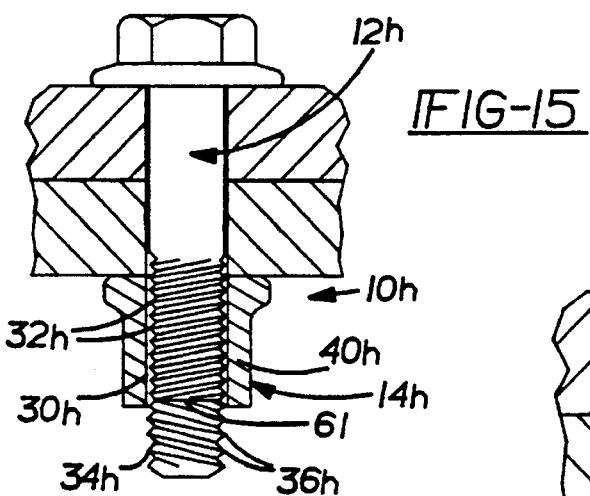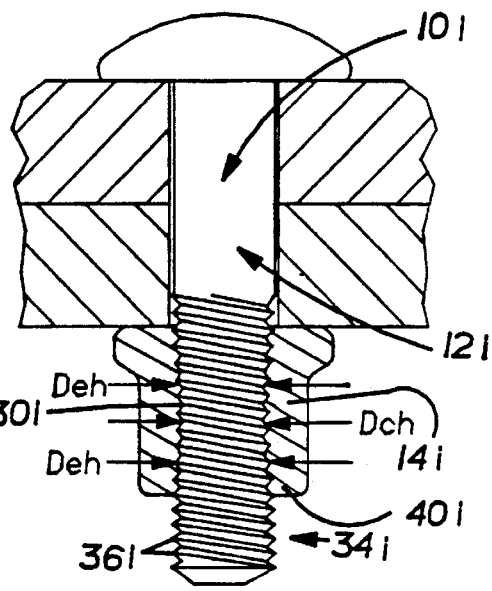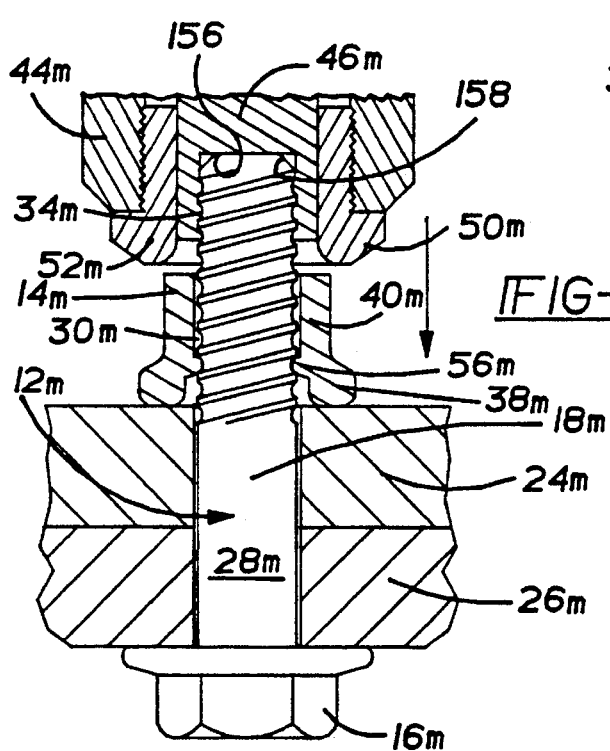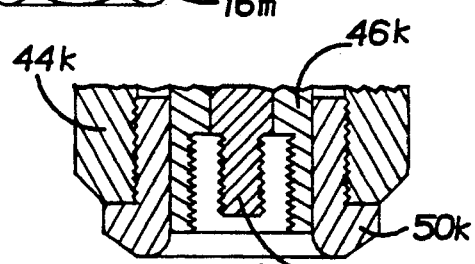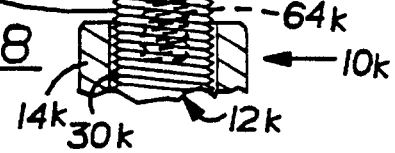

FASTENER SYSTEM INCLUDING A SWAGE FASTENER AND TOOL FOR INSTALLING SAME

This is a division of U.S. patent application Ser. No. 08/189,871, Filed Feb. 1, 1994 U.S. Pat. No. 5,548,889, which issued Sep. 27, 1996, which was a continuation of Ser. No. 7/765,399, filed Sep. 24, 1991, U.S. Pat. No. 5,315,755, which issued May 31, 1994, which was a continuation of Ser. No. 07/654,412, filed Feb. 11, 1991, now abandoned, which was a continuation of Ser. No. 07/359,482, filed May 31, 1989, now abandoned.

SUMMARY BACKGROUND OF THE INVENTION

The present invention relates to a fastener system for multi-piece swage type fasteners, methods of installation and a tool for installing such fasteners.

The present invention relates to two-piece swage type fasteners or lockbolts generally of the type illustrated in U.S. Pat. Nos. 2,531,048 and 2,531,049 to L. Muck both issued on Nov. 21, 1950, and in U.S. Pat. No. 3,915,053 to J. Ruhl, issued Oct. 28, 1975.

Swage type fasteners of the type noted are frequently of a two-piece construction comprising a pin and a collar adapted to be swaged into locking grooves on the pin. The fasteners shown in the referenced '048 and '049 patents are pull type swage fasteners while those shown in the '053 patent include both pull type and stump type versions of swage fasteners. In the typical pull type fastener, the pin is provided with an enlarged head and a pin shank having locking grooves in a lock groove portion; the pin shank terminates in a pintail portion constructed with pull grooves adapted to be gripped by a jaw assembly of an installation tool. A swage anvil is provided on the tool to engage and swage the collar into the locking grooves. A relative axial force is applied between the pin and collar, and hence between workpieces to be fastened together, as the tool pulls on the pin via the pintail portion with the force being reacted by the engagement of the swage anvil with the collar. This relative axial force pulls the workpieces together under an initial clamp load.

As the relative axial load increases the swage anvil moves axially to radially overengage the collar, swaging it into the locking grooves, whereby the pin and collar are locked together and the final clamp load on the workpieces is developed. The swage anvil has a swage cavity which receives the collar circumferentially for 360° and axially over the majority of the length of the collar or collar shank where a flanged collar is employed whereby a substantial portion of the swageable collar material is deformed into the locking grooves of the pin, generally uniformly around its circumference.

The pintail portion is connected to the locking groove portion by a breakneck groove which is constructed to break at a preselected axial load after the swaging step has been completed whereby the pintail portion is severed and discarded.

In the stump type version, the lockbolt is set by a squeeze type tool which has a stationary member at one end of the workpieces for engaging the pin head and a swage anvil at the opposite end for engaging the collar. The fastener is set as the anvil moves axially against and radially over the collar with the axial force being reacted by the engagement of the stationary member with the pin head. Thus the stump type fastener has the advantage of a shorter pin shank since the pintail portion with pull grooves and breakneck groove is not required. Because of the latter the stump version has the advantage of being lighter and of a lower cost.

But there are other advantages of the stump type swage fastener relative to the pull type fastener. With the pull type fastener, the severed pintail portion creates debris in the work area requiring periodic collection and disposal. Also the stump version will assure a smooth, finished end at the pin shank whereas the pull type pin shank will occasionally have a rough surface from the break at the breakneck groove. Finally the noise occasioned by pinbreak is absent in the stump type fastener.

There are, however, numerous applications in which a stump type fastener cannot be used or it is not expedient to do so. One example is an assembly in which there is insufficient clearance on the pin head side of the workpieces to permit access for the related stationary portion of the squeeze tool. Another example is an assembly having insufficient clearance to permit insertion of the longer pull type pin into the mating openings of the workpieces. The present invention addresses such problems. Thus with the present invention a unique fastening system including a swage type fastener and installation tool is provided for a pull type installation but, as will be seen, having advantages of a stump type fastener and installation. Indeed, where both squeeze type and pull type applications and apparatus are present, the fastener of the present invention can be installed in either fashion resulting in a reduction in overall inventory and in the numbers of different parts to be stocked.

Thus the present invention is of a swage type fastener with a pin having a shank constructed without a severable pintail portion but terminating in a short, threaded or other gripable, pull portion of minimal length. A unique tool is shown which functions to provide a pull type installation; the tool includes a threaded, hardened nut member adapted to threadably engage the short pull portion via rotation by a rotary drive motor. Once a sufficient number of threads have been engaged or gripped by the nut member, the pull tool is actuated to apply a relative axial force by pulling on the pin, through the nut member, with a swage anvil engaging the collar to react the pulling force. At this juncture, the fastening system performs similarly to a pull type installation system. Thus as the magnitude of the relative axial force increases the workpieces being secured are pulled and clamped together under a desired preload. Upon further increases in the axial force the anvil will be moved axially to radially overengage the collar and swage it radially into the locking grooves on the pin shank providing the final clamp load. Next the direction of relative axial force between the swage anvil and nut member is reversed moving the swage anvil in the opposite axial direction to thereby eject the swaged collar. Finally, the hardened nut member is reverse rotated from the short, threaded pull portion removing the installation tool and completing the installation. A rotary drive motor in the pull tool is used to thread the nut member onto and off from the threaded pull portion. Thus no pintail portion is required to be removed after swage and hence there is no related debris. In addition the installation is quieter since pinbreak noise is eliminated. The length of pin shank comprising the short, threaded pull portion is minimal, i.e. around four threads, such that only a small difference in length of pin shank remains relative to a comparable stump type pin set by a squeeze tool and/or the pin shank of a pull type fastener after the pintail portion has been removed by a conventional pull type tool.

In one form of the invention the lock grooves and threads of the pull portion of the pin are in the form of a continuous helical male thread. The collar is provided with a mating, female thread of a preselected extent such that an initial clamp of the workpieces can be accommodated. However, the female collar thread is selected to be of a limited circumferential extent and shear strength such that, in response to the relative axial force and at a level prior to the initiation of collar deformation into the lock grooves of the pin, it will shear or deform; in this condition the collar will be generally free to move axially over the pin and to respond to the installation loads in the same manner as a collar without such limited female thread form.

The preceding fastener structure with limited threaded collar is sometimes referred to as a "fit-up fastener" and is shown and described in the U.S. Patent application of R. Dixon for "Variable Clamp Fastener and Method" No. 282,875, Filed Dec. 19, 1988 issued into U.S. Pat. No. 4,867,625 on Sep. 19, 1989 and is incorporated herein by reference; that structure, however can be considered as prior art to the present invention. One advantage of the fit-up fastener structure in a combination in the present invention is that the workpieces can be initially pulled together to remove gap thereby providing greater certainty that a sufficient number of the threads of the pull portion will extend beyond the collar and be accessible for gripping by the nut member.

Alternatively, a collar with a flexible tab can be used for fit-up; such a structure is shown in the U.S. Pat. No. 4,813,834 for "Fit-Up Fastener With Flexible Tab-Like Structure and Method of Making Same" issued Mar. 21, 1989 to Walter J. Smith.

In a preferred form of the invention, the tool nut member is designed simply to threadably engage and thereby grip the minimum length pull portion of the pin; thus, in this first step, the tool nut member is not moved against the collar with any significant force and hence is not used to pull the workpieces together and/or clamp them under an initial preload. After the threaded engagement step, the installation tool is actuated to cause the swage anvil to move axially against the collar in response to a relative axial force applied between the nut member and the anvil. Thus the initial clamp up and preload of the workpieces is substantially provided for the first time by the relative axial force applied between the nut member as engaged with the pull portion of the pin shank and the engagement of the swage anvil with the collar. As previously described, the relative axial force is increased until the swage cavity of the anvil is moved axially to radially overengage the collar swaging the collar material into the pin. With this construction, the rotary drive motor for the nut member simply provides the function of threading the nut member on and off the short pull portion of the pin shank and is not used to apply any significant axial load to the workpieces. Thus the capacity of the drive motor can be small permitting the overall size of the installation tool to be minimized. In one form of the invention, the engagement of the tool nut member on the threaded pull portion is limited and the nut member positioned thereon such that the collar, upon elongation in swage, will essentially not engage the nut member. Thus no significant axial bearing load will be applied against the nut member from collar elongation after swage; this inhibits increases in friction between the engaged threads of the nut member and pull portion which would result from such bearing load. In this way removal torque can be maintained low which also facilitates the use of a rotary motor of minimal size.

Prior crimp type fasteners, while utilizing a pintail-less or stump-like structure would not provide the same advantages and/or ease of installation as the present invention. For example, a threaded crimp type fastener would not provide the same flexibility and ease of installation and would require more complex installation tools. In this regard see the U.S. Pat. No. 3,421,562 to J. Orloff et al issued on Jan. 14, 1969. There a threaded fastener nut or collar is first installed on a threaded pin shank and torqued to provide initial pull together and clamp up of the workpieces of a first magnitude; the final clamp load is achieved by crimping a smooth portion of the nut resulting in elongation of the nut and an increase in clamp load to a desired final magnitude. Thus in the system of the '562 patent the fastener is not set as either a stump type or pull type as described and is unlike the system and fastener of the present invention. In this regard see also the U.S. Pat. No. 3,803,793 to W. Dahl issued on Apr. 16, 1974.

Another crimp type fastener is shown in the U.S. Pat. No. 4,012,828 to W. Dahl issued Mar. 22, 1977. There a threaded mandrel on a tool is first threaded onto a threaded pin shank until the mandrel engages a smooth bored collar to clamp the workpieces together and to apply an initial preload of a first magnitude. Next crimping jaws, spaced radially about the collar, are actuated to move radially inwardly to deform the material of the collar into threads or locking grooves in the pin. The resultant collar elongation reacts between the engaged workpiece and the engaged end of the threaded mandrel to provide an increased clamp load of a final magnitude. After disengaging the crimping jaws, the mandrel is threaded off the pin to complete the installation. Thus, again, in the system of the '828 patent, the fastener is not set as the stump or pull type fastener in the manner previously described and also is unlike the system and fastener of the present invention. See also the U.S. Pat. No. 3,920,338 issued to W. Dahl on Nov. 18, 1975.

The U.S. Pat. No. 3,025,730 issued to H. Brilmyer et al on Mar. 20, 1962 discloses the use of a manual installation tool on a swage fastener having a threaded pintail portion and a breakneck groove with a nut on the tool threadably engageable with the pintail portion. The system and fastener of the '730 patent is also unlike the system and fastener of the present invention.

The U.S. Pat. No. 4,299,519 issued to R. Corbett on Nov. 11, 1981 discloses a fastener with a minimum length removable pintail portion; it also discloses a pin having an internally engageable pull groove structure and no removable pintail portion. That fastener, however, does not disclose the externally, threaded short pull portion nor does it disclose an internally threaded gripping portion.

As will be seen from the description of the embodiments which follows, various combinations of fastener pins and collars can be used with the system and installation tool of the present invention. Thus it is an object of the present invention to provide a unique fastener system including novel swage type fasteners having the advantages of a stump type fastener and being installed generally as a pull type fastener.

It is another object of the present invention to provide a novel fastening system including a unique installation tool for use in setting swage type fasteners.

It is another general object to provide a unique fastening system including a novel swage type fastener and a novel installation tool.

Other objects, features, and advantages of the present invention will become apparent from the subsequent description and the appended claims, taken in conjunction with the accompanying drawings, in which:

FIG. 5 is an enlarged, fragmentary view of a portion of an installation tool, similar to that shown in FIGS. 1–4, but with the tool nut member having a different thread configuration;

FIG. 6 is a view similar to FIG. 1 but depicting a modified swage type fastener having a pin of a different form including a threaded pull portion and a locking portion with annular locking grooves;

FIG. 8 is a view, to reduced scale, of the fastener and tool portion of FIG. 7 shown after a nut member of the tool portion has been initially threadably applied to a threaded pull portion of the pin;

FIG. 13b is a pictorial view of the collar of FIG. 13a;

FIG. 15 is an elevational view similar to FIG. 14 but showing a different form of swage type fastener with the pin having opposite hand threads for the locking groove and pull groove portions but with such portions being of a similar dimension and with the collar having a flexible tab such as depicted in FIG. 11;

FIG. 16 is an elevational view of a swage type fastener depicting the fastener with a threaded pin after it has been set with the pin being deformed by the swaged collar to have an hour glass configuration whereby removal of the swaged collar by unthreading is resisted;

FIG. 17 is a fragmentary elevational view of a swage type fastener and a portion of an installation tool with the pin having an internal thread at its outer shank end and with the tool portion having a threaded mandrel adapted to engage the internal thread to apply thereby a relative axial force for setting the fastener;

FIG. 18 is a fragmentary elevational view of a swage type fastener and portion of an installation tool similar to that of FIG. 17 but with the pin having both internal and external gripping threads and with the tool portion having a mandrel and a nut for separate engagement of both the internal and external threads for setting the fastener;

FIG. 21 is a fragmentary view depicting a variation of the installation tool of FIG. 19.

Figure 1:
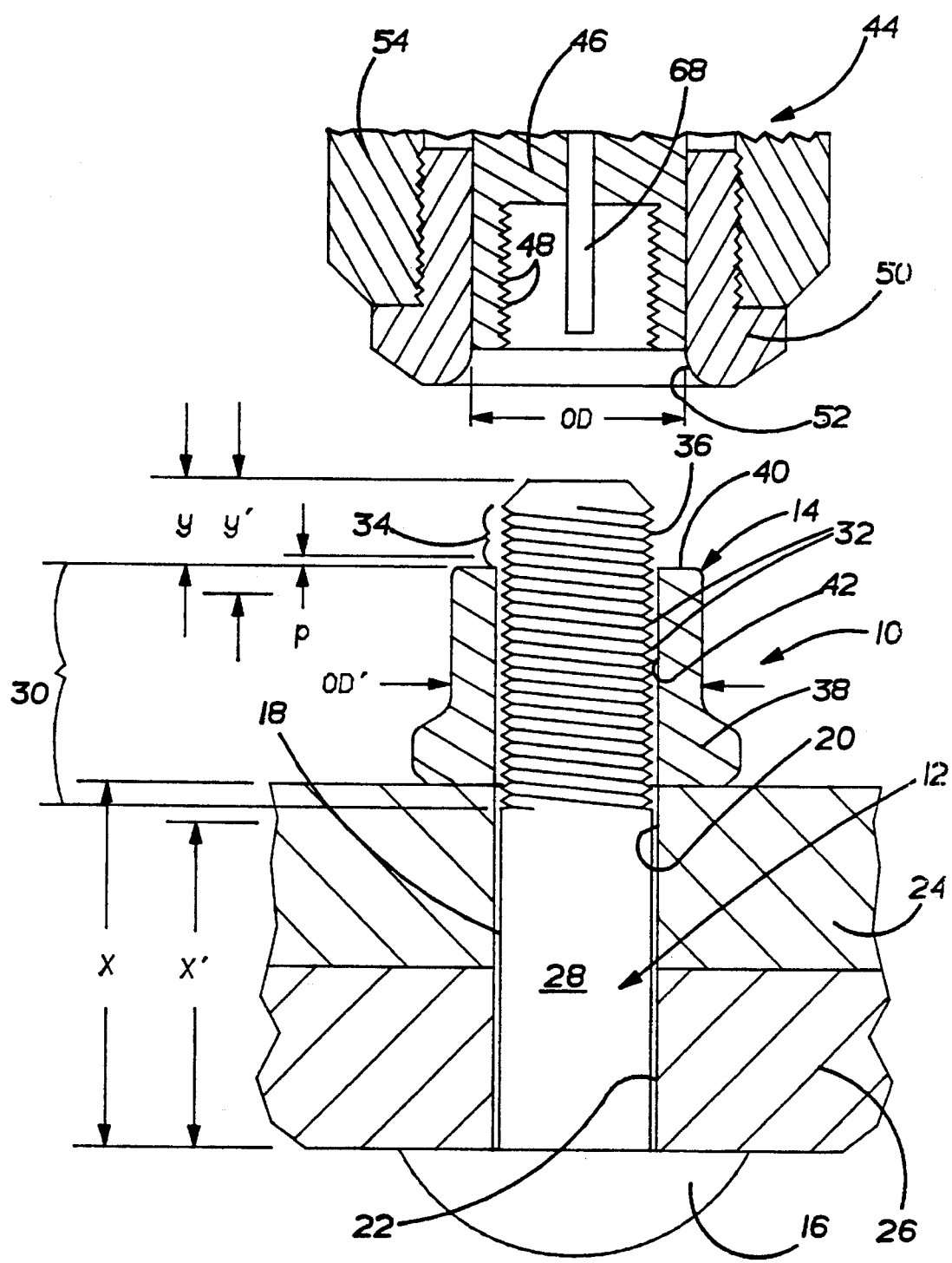
FIG. 1 is an elevational view with some parts shown broken away and others shown in section of a swage type fastener including a pin and a collar and embodying features of the present invention shown in relationship to a portion of a tool of the present invention for installing the fastener with the tool not yet applied to the fastener for installing the fastener.

Referring to FIGS. 1 through 4, there is shown a multi-piece fastener 10 that includes a pin 12 and tubular collar 14. The pin 12 includes an enlarged head 16 and a pin shank 18 adapted to be received in aligned openings 20 and 22 in a pair of workpieces 24 and 26, respectively. The fastener 10 is a swage type fastener with the pin 12 being of a stump type construction but which is adapted to provide installation as a pull type fastener; alternatively the pin 12 facilitates installation of the fastener 10 as a stump type fastener. Thus the pin shank 18 is constructed without a pintail portion and breakneck groove for severing such pintail portion. Pin shank 18 has a smooth shank portion 28 adjacent the enlarged head 16 followed by a lock groove portion 30 (in brackets) having locking grooves 32 and terminating in a short pull portion 34 (in brackets) having helical pull grooves 36. In the embodiment shown in FIGS. 1–4 the lock grooves 32 and pull grooves 36 are defined by a uniform, continuous helical thread which can be of a standard thread form such as a UNC and/or UNF thread form. Collar 14 is of a cylindrical construction with an elongated collar shank 40 terminating at one end in an enlarged flange 38. The collar 14 is adapted to be received upon the threaded lock groove portion 30 via a smooth through bore 42 of generally uniform diameter.

The fastener 10 can be used to join together workpieces 24 and 26 of varying combined thicknesses from a maximum thickness X to a minimum thickness X'. The length of the pin shank 18 is selected to be minimal to accommodate workpieces varying in such total thickness within this grip range. In order to accomplish this, the pull portion 34 is maintained at a minimal length. Thus the pull portion 34 is of a short, limited length Y such that the excess length of pin shank 18 extending beyond the outer end of collar 14 will be Y for a maximum grip condition X and a greater distance of Y' for a minimum grip condition X'. As will be seen, the length Y of pull portion 34 is selected to provide a sufficient number of threads to accept the pulling force to be applied therethrough to set the fastener 10 as a pull type fastener. In addition the pin shank 18 can be provided with a slight excess length such that the pull portion 34 will be spaced from the outer end of the collar 14 before and after swage for a purpose to be described.

FIGS. 1–4 show a portion of a tool 44 for installing the modified stump type fastener 10 as a pull type fastener. The tool 44 comprises a rotary nut member 46 having internal gripping threads 48 sized to threadably engage the helical pull grooves 36 of pull portion 34. The tool 44 further includes an annular anvil member 50 having a swage cavity 52 which receives the nut member 46; as will be seen, the anvil member 50 is connected to an outer, anvil housing 54 adapted for axial movement relative to the nut member 46. The swage cavity 52 of the anvil member 50 is of a generally circular cross section of a diameter OD which is smaller than the circular outside diameter OD' of collar shank 40 such that as the anvil member 50 moves axially along and radially over collar shank 40, the collar material is swaged radially into the helical locking grooves 32 on pin shank 18, thereby securing the pin 12 and collar 14 to each other and securing the workpieces 24 and 26 under a desired clamp load. The swaging occurs generally over 360° of the engaged circumference of the collar shank 40 and generally over the majority of its length, i.e. preferably between around 75% and around 90% of the length of collar shank 40.

Figure 2:
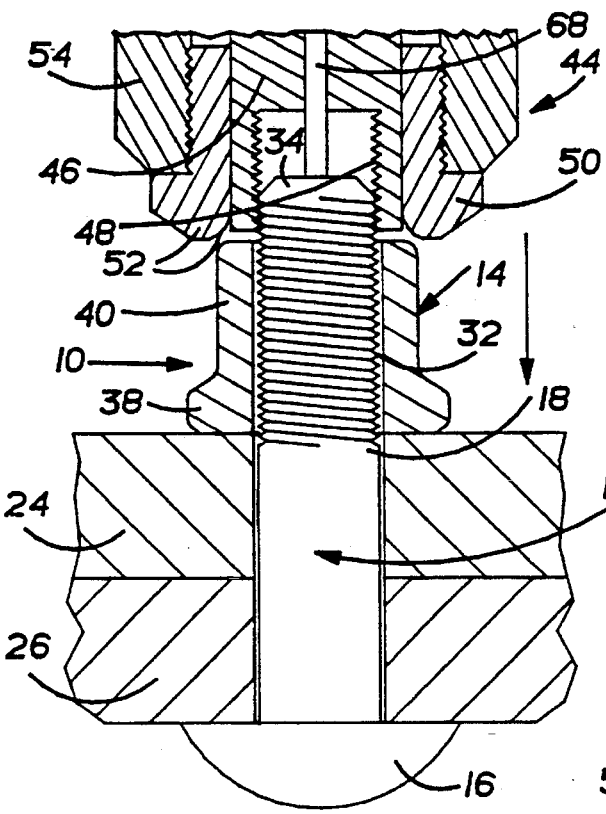
FIG. 2 is a view; to reduced scale, of the fastener and tool portion of FIG. 1 shown after a nut member of the tool portion has been initially threadably applied to a threaded pull portion of the pin.
Figure 3:
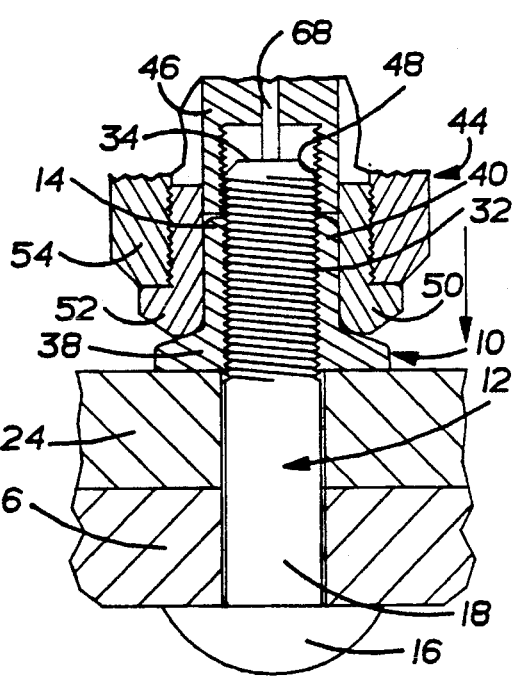
FIG. 3 is a view, to reduced scale, of the fastener and tool portion of FIG. 1 shown after the collar has been swaged via a swage anvil into locking grooves on the pin.
Figure 4:
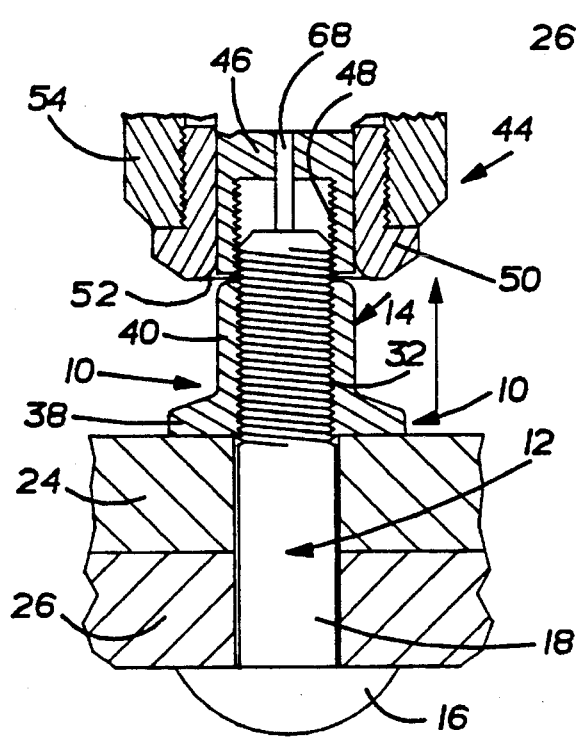
FIG. 4 is a view, to reduced scale, of the fastener and tool portion of FIGS. 1–3 shown after the swage anvil of the tool portion has ejected the swaged collar but while the nut member of the tool portion is still threadably engaged with the pull portion of the pin.

FIG. 2 shows the tool 44 after nut member 46 has been threaded to a predetermined position onto the pull portion 34 of pin shank 18 to initially grip the pin 12. Next, as shown in FIG. 3, the tool 44 is actuated to cause the anvil housing 54 to move axially forwardly relative to the nut member 46 and hence relative to the gripped pin 12. This action brings the swage anvil member 50 into engagement with the outer end of the collar shank 40 to apply a relative axial force between the pin 12 and collar 14. As this force continues the workpieces are initially clamped together under a desired preload. The relative axial force increases moving the anvil swage cavity 52 axially to radially overengage the collar shank 40 to swage the collar material radially into the locking grooves 32 of the pin 12. After the swaging step has been completed the relative axial force between the anvil housing 54 and the nut member 46 is reversed whereby the swaged collar shank 40 is ejected from the swage anvil 50 (see FIG. 4). The nut member 46 is now reverse rotated to remove it from the pin pull portion 34 and the installation is complete; with workpieces 24 and 26 of maximum grip or combined thickness X, the set fastener 10 will have a minimal excess length Y of pin shank 18 extending beyond the outer end of the collar shank 40. Thus no pintail portion is required resulting in the advantages previously noted.

In a preferred form of the invention, the pull portion 34 at maximum grip X is located a minimal clearance distance of around one thread pitch P from the outer end of the collar shank 40 after initial clamp up and prior to swage (see FIGS. 1 and 2). This clearance P is selected to avoid engagement of the outer end of collar shank 40 with the nut member 46 upon elongation of the shank 40 from swage whereby loading of the engaged threads between the nut member 46 and pull portion 34 is avoided or negligible such that the removal torque required on the nut member 46 can be kept low permitting the use of a small capacity rotary motor whereby the overall size of tool 44 can be minimized.

The internal gripping threads 48 of the nut member 46 are of greater strength than the threaded pull grooves 36. Nut member 46 can be formed from a high strength alloy or case hardened material having a hard, wear-resistant surface on its internal gripping thread 48. In one form of the invention nut member 46 was formed of a ferrous material having a Rockwell hardness of around 50 Rc.

In the form of the fastener 10 of FIGS. 1–4 the pin 12 can be constructed of a ferrous material and have a Rockwell hardness of around 33 to around 39 Rc for a grade 8 type fastener and a hardness of around 25 to around 35 Rc for a grade 5 type fastener; however, in order to enhance the strength of the pull grooves 36 and hence minimize the necessary overall length of pull portion 34, the pull portion 34 can be hardened to a Rockwell hardness of at least around 5 Rc greater than the hardness of the remainder of the shank or preferably abound 15 Rc harder. In any event it is desirable that no more than around four threads or pull grooves 36 be required to sustain the relative axial pulling loads required to set the fastener. In this regard, it is desirable that the number of pull grooves 36 be selected having a shear strength no greater than around 30% and preferably 20% more than that required to sustain the maximum load applied to the fastener 10 by the tool 44 to set the fastener 10 in a maximum grip condition. Thus the number of threads of the helical pull grooves 36 engaged is selected to provide adequate strength to withstand the relative axial pulling load to be subsequently applied in setting the fastener 10.

In the embodiment shown in FIGS. 1–4 the internal gripping threads 48 on nut member 46 and threaded pull grooves 36 can be of a generally conventional, mating construction. However, it may be advantageous to use a somewhat modified thread on the nut member. Such a modified structure is shown in FIG. 5 where components similar to like components in the embodiment of FIGS. 1 to 4 are given the same numeral designation with the addition of the letter postscript "a" and unless described otherwise are substantially identical with the like components of FIGS. 1–4. Looking now to FIG. 5 the threads of the nut member are constructed to facilitate initial engagement. Thus the internal gripping threads 48a of nut member 46a have shoulders 55 which are of a width W which is less than the width W' of associated grooves 55' across the pitch line. In one form of the invention the shoulder width W across the pitch line was around 75% of groove width W'. Also the crest diameter D of each gripping thread shoulder 55 closely approaches the root diameter D' of the pull grooves 36a in order to maximize the effective shear arc of the pull grooves 36a. Thus, the gripping threads 48a, utilizing the features noted, are configured relative to the helical pull grooves 36a to facilitate initial engagement onto the pull portion 34a without cross threading or thread stripping and to enhance the effective shear areas. It will be seen, however, that various combinations of internal gripping threads 48, 48a on nut member 46, 46a and pull grooves 36, 36a on pull portion 34, 34a can be advantageously utilized.

In some applications, it may be desirable that the locking groove portion not be threaded and that the locking grooves be annular and not helical. Such a construction is shown in the embodiment of FIG. 6 where components similar to like components in the embodiment of FIGS. 1 to 4 are given the same numeral designation with the addition of the letter postscript "b" and unless described otherwise are substantially identical with the like components of FIGS. 1 to 4.

Thus looking now to FIG. 6, the pin 12b has its locking groove portion 30b formed with locking grooves 32b which are annular, i.e. generally circular and not helical, see '048 and '049 patents to L. Huck. The remainder of the structure of fastener 10b is the same as fastener 10 such that pull grooves 36b of pull portion 34b are defined by a helical thread form whereby the installation of fastener 10b will be essentially the same as that for fastener 10.

As indicated, the fit-up fastener construction of the R. Dixon application could be used advantageously in the present invention to provide initial pull together of the workpieces and hence to assist in providing that the desired length of pin pull portion will be accessible to the nut member. Such a construction is shown in FIGS. 7 to 10 where components similar to like components in the embodiment of FIGS. 1–4 have been given the same numeral designation with the addition of the letter postscript "c" and unless described otherwise are substantially identical with the like components of FIGS. 1 to 4.

Looking now to FIGS. 7 to 10, a fastener 10c is shown to include a pin member 12c and tubular collar 14c. Pin member 12c has an elongated shank 18c which extends with a clearance fit through aligned openings 20c and 22c in a pair of workpieces 24c and 26c, respectively, to be secured together. An enlarged protruding head 16c at one end of pin shank 18c engages one side of workpiece 26c. A straight shank portion 28c extends from pin head 16c and is followed by a lock groove portion 30c defined by a plurality of lock grooves 32c having a continuous, helical thread form. The outer end of the pin shank 18c terminates in a pull portion 34c having a plurality of pull grooves 36c defined by a continuous, helical thread form.

The tubular collar 14c has a generally straight shank 40c terminating in an enlarged flange 38c. Both the pin head 16c and collar flange 38c can be provided with wrenching flats to facilitate gripping by a wrench or other suitable tool for applying a relative torque between the pin member 12c and collar 14c (see FIGS. 7 and 9). With regard to the latter, the collar 14c has a generally smooth bore 42c of an internal diameter to be in clearance with the pin shank 18c; a female thread 56 is formed at the flange end of the bore 42c and is adapted to complementarily, threadably engage the helical locking grooves 32c. For a reason to be seen the collar thread 56 is of a limited extent.

In operation, then, the workpieces 24c and 26c can be first joined together by the threaded engagement between the limited collar thread 56 and the threaded lock grooves 32c. The wrenching surfaces on the pin head 16c and collar flange 38c facilitate torquing to a desired magnitude or extent of clamp. After this has been accomplished the installation tool 44c is applied to the fastener 10c and a relative axial force is applied between the pin 12c and collar 14c via the nut member 46c threadably engaging the threaded pull grooves 36c of pull portion 34c and the swage anvil member 50c engaging the outer end of the collar shank 40c. As the relative axial force increases, the limited collar thread 56 will shear or deform sufficiently to permit the shank 40c of collar 14c to move further axially relative to the pin 12c. FIG. 8 depicts the fastener 10c after the nut member 46c has been threaded onto the pull grooves 36c, the collar thread 56 has been deformed, and the relative axial force has been increased to initially swage or snub the collar 14c into the lock grooves 32c. In this condition, the pin 12c and collar 14c will now act in the same manner as pin 12 and collar 14 in the embodiment of FIGS. 1–4. Thus the workpieces 24c and 26c are clamped together at a preselected preload by the relative axial force initially applied by the tool 44c between the pin 12c and collar 14c; as the axial force increases, the collar shank 40c is swaged into the helical locking grooves 32c completing the swaging operation (see FIG. 10). Subsequently, upon further actuation of the tool 44c the swaged collar shank 40c will be ejected from the anvil swage cavity 52c and the nut member 46c threaded off from the pull portion 34c thus completing the installation.

Note that the contour of the swage cavity 52c of the anvil member 50c and the contour of the outer end of the collar shank 40c are such that swaging of the collar shank 40c into the locking grooves 32c will not start to occur at the lower magnitude of relative axial force required to shear or deform the limited collar thread 56 at the initiation of the swage step.

In one form of the invention, the helical locking grooves 32c are of a shallow construction and have a contour closely approximating a streamlined root configuration as shown in the Dixon application. With the fastener construction of FIGS. 7–10, it has been found that the depth of the locking grooves 32c can be selected to provide a desired minimum ratio of depth h to the crest diameter Du of the pin 12c. The major criteria of groove depth h is that it be sufficiently deep as a practical matter to receive and retain the material of the collar 14c after swage. A groove depth h of around 0.04×Du or less is desirable, i.e. $(h/Du) \times 10^2 = 4$. With such a shallow groove, the root diameter Dr will be maximized for a pin with a given crest diameter Du. This will provide that a pin 12c of a given material will have nearly the maximum tensile strength available since tensile failure would generally occur across the root diameter Dr which, when maximized, is only slightly less than the crest diameter Du. The maximized root diameter Dr will also provide improved fatigue life.

With a shallow groove construction, it is desirable to provide the collar shank 40c with a volume such that when swaged into the helical locking grooves 32c it will have an excess volume over that required to fill the grooves 32c. In one embodiment, the volume of collar shank 40c was selected to provide 'overpacking' i.e., a volume of collar shank 40c to provide substantially more volume of collar material for filling grooves 32c than they could normally accept within the swage envelope of the swage cavity 52c of anvil member 56c and the confronting portion of pin 12c. It has been found desirable to provide a volume of collar material which has an excess of at least around 16%. The percentage 'overfill' or 'overpacking' noted can be generally determined in the manner described in the noted Dixon application.

Because of the shallowness of the locking grooves 32c, it is desirable that the pin 12c be hard enough relative to the hardness of the collar 14c to resist crushing or substantial yielding in tension or necking down from the high compressive swage loads. Thus, in one form of the invention, the pin 12c could be made of AISI 4140 alloy steel or AISI 1541 carbon steel having an ultimate shear strength of at least around 95 KSI. The collar 14c could be made of AISI 1035 carbon steel having an ultimate shear strength of at least around 45 KSI. Generally it is desirable to utilize a pin 12c having an ultimate shear strength relative to that of collar 14c in the ratio in a range of around 1.8:1 to around 2.4:1. Thus the pin 12c has a sufficient hardness to accept both the high tensile preloads desired and the swage loads on the collar 14c substantially without yielding. The wall thickness of collar shank 40c is selected to provide the necessary material to promote swaging into the shallow helical locking grooves 32c and flow in elongation to provide the desired clamp load. At the same time, the collar wall thickness at final swage is also selected to provide sufficient, radial stiffness or hoop strength to resist significant radial spring back from the locking grooves 32c both during initial swage and also under subsequent tensile loading. Also, the volume of the collar 14c and swage cavity 52c are selected to provide movement of the material of collar shank 40c into the locking grooves 32c to assure a good fill. See the noted Dixon application.

Figure 7:
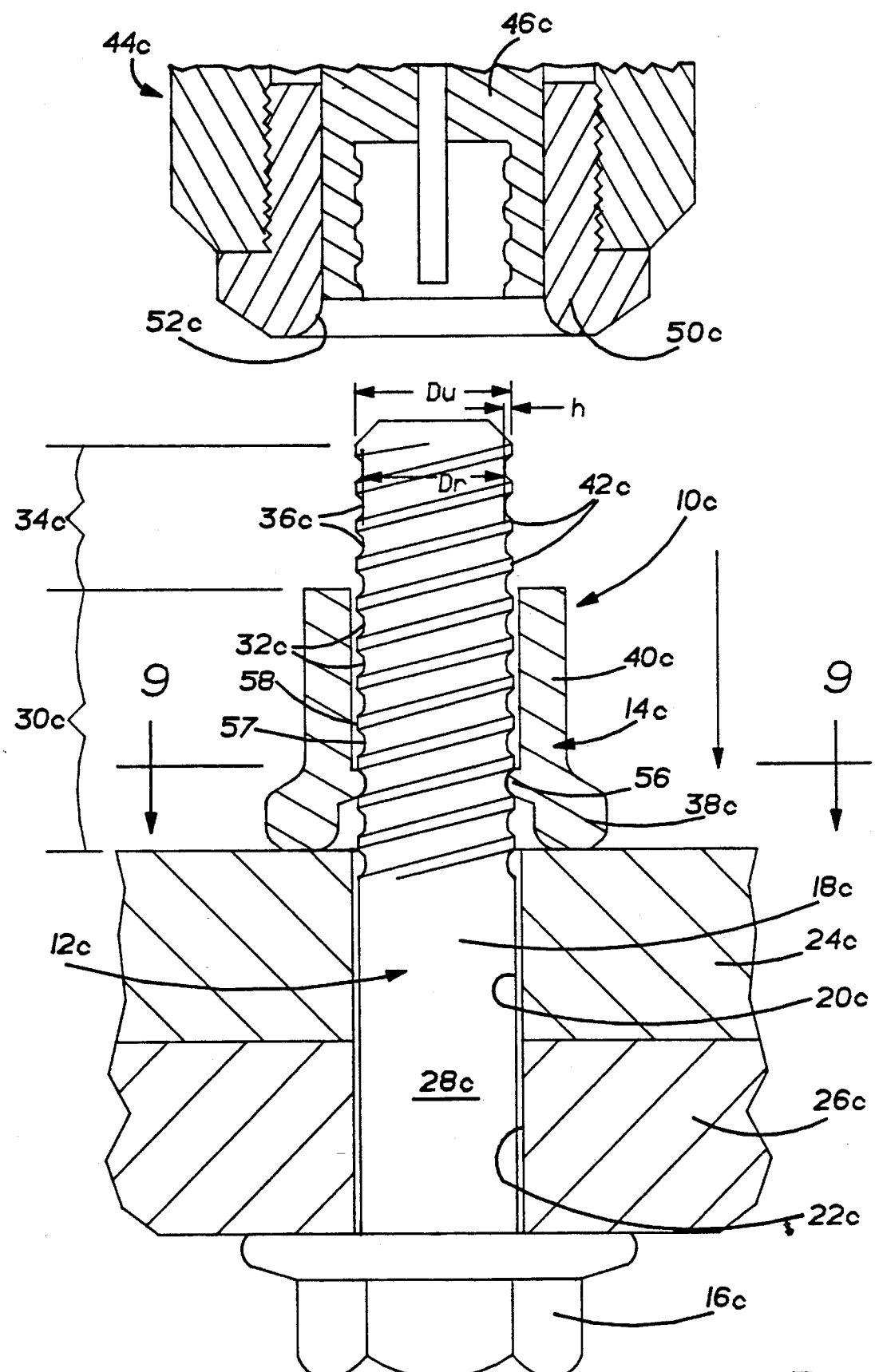
FIG. 7 is a view similar to FIG. 1 of a swage type fastener and portion of a tool but depicting a modified swage type fastener including a collar having a partial thread to provide initial fit-up of the workpieces via engagement with a threaded pin.
Figure 9:
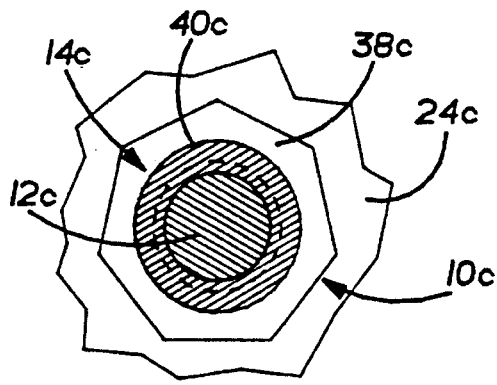
FIG. 9 is a view, to reduced scale, of the fastener and tool portion of FIG. 7 shown after the collar has been swaged into locking grooves on the pin and initial swaging or snubbing of the collar has occurred.
Figure 10:
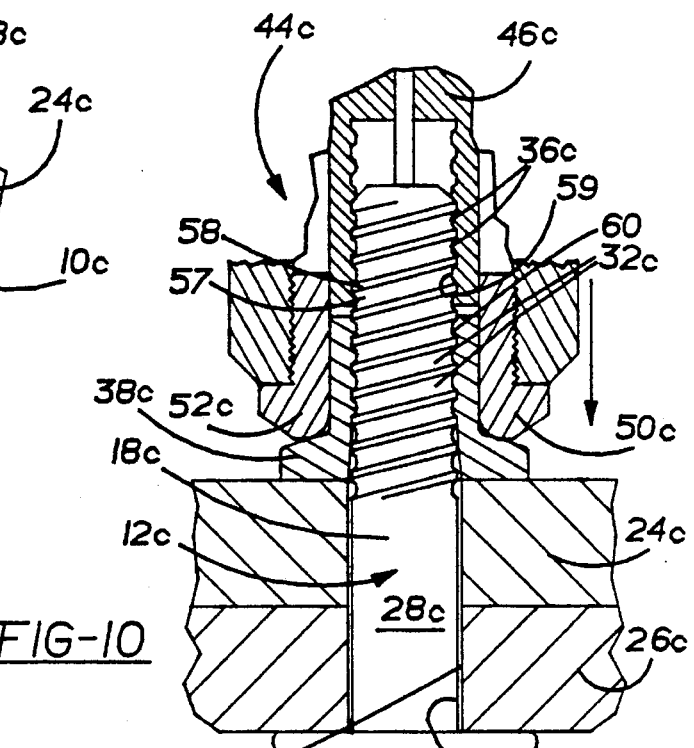
FIG. 10 is a view, to reduced scale, of the fastener and tool portion of FIGS. 7–9 shown after a swage anvil of the tool portion has ejected the swaged collar but while the nut member of the tool portion is still threadably engaged with the pull portion of the pin.

It is also desirable, that the widths of the groove portions 57 and pin shoulder portions 58 of locking grooves 32c and the complementary groove portions 59 and shoulder portions 60 of the swaged collar 14c be proportioned in width relative to the respective shear strengths of the materials of pin 12c and collar 14c such that both the pin shoulder portions 58 and the collar houlder portions 60, defined by interlocking material of the swaged collar 14c, are in incipient or simultaneous failure in shear at or above the preselected minimum ultimate design tensile load for the fastened joint of workpieces 24c and 26c (see FIGS. 7 and 10). It is preferred that the design provide for the collar shoulder portions 60 to fail prior to the pin shoulder portions 58, i.e. the pin shoulder portions 58 would fail in shear at approximately 110% of the tensile load at which the collar shoulder portions 60 would fail. By proportioning the grooves as noted, the engaged length of pin and collar can be minimized for a given tensile load. Of course, by providing sufficient collar length, the above shear strength relationship can be maintained while providing for a tensile failure diametrically across the pin lock groove portion 30c.

Another advantage of employing proportioned strength as noted is that the shear strength of the limited collar thread 56 can now be maximized permitting the pre-fastened clamp via torquing to be at a relatively high magnitude and/or permitting the fastener 10c in its pre-fastened clamp condition to withstand the necessary loads to hold the structure together during a fit-up operation. This is achieved by virtue of the fact that the width of collar thread 56 is substantially the same as the width of the pin groove portions 57 of helical locking grooves 32c.

While the preceding relationships are taught in the noted Dixon application they can be of particular advantage in combination with the present invention. Thus, for example, in some instances the workpieces could be pulled together removing the gap therebetween and assuring that a minimum length pin could be used.

In some applications it is desirable that the fastener be readily removed the same as a nut and a bolt. However, in a swage type fastener with a threaded pin the forces applied to the pin by the collar material during swage could result in distortion of the pin thread such that removal of the collar by unthreading would be severely hampered. With the fastener 10c, the pin 12c is constructed of a high strength material relative to the strength of the collar 14c and the lock grooves 32c are of the shallow form all as previously described; this results in little distortion of the lock grooves 32c from the swaged collar 14c thereby facilitating removal of the set fastener 10c by simply unthreading the swaged collar 14c from the pin 12c.

As previously noted, it is desirable that the nut member 46c be readily, threadably applied to the helical pull grooves 36c. In the embodiment of FIG. 5 the internal gripping threads 48a of nut member 46a were configured to facilitate initial engagement with the pull portion 34a where the pull grooves 36a had a generally standard thread form. But such initial engagement is also facilitated by a construction of pull grooves where the crests or shoulders are of a lesser width than the width of the associated grooves. In the embodiment shown in FIGS. 7 to 10, the helical pull grooves 36c are a continuation of and of the same construction as the associated locking grooves 32c previously described. For purposes of ease of engagement it is believed that a ratio of the width of pin groove portions 57 of pull grooves 36c to the width of pin shoulder portions 58 of around 1.25:1 and greater may be desirable. On the other hand and as noted, a ratio of around 1.8:1 to around 2.4:1 would be more desirable for the full advantage of proportioned strength of the locking grooves 32c in the locking groove portion 30c. The lower ratio for the pull groove portion 34c is also desirable to provide increased shear area and hence shear strength to resist the pull loads. Both can be accommodated by providing the locking grooves 32c to be constructed to have the higher ratio for proportioned strength and the pull grooves 36c to have a lower ratio for increased shear strength to resist the pull load. This would also permit the use of fewer pull grooves thereby facilitating the construction of a pull portion of a minimum length. Such a construction is shown in FIG. 11 where components similar to like components in FIGS. 7 to 10 have been given the same numeral designation with the addition of the letter postscript "d".

Figure 11:
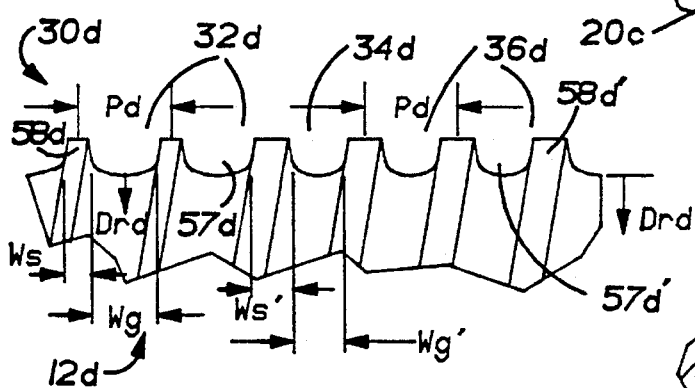
FIG. 11 is a fragmentary view to enlarged scale depicting a pin with different thread forms for the pull groove portion and the locking groove portion of the pin.

Looking now to FIG. 11, the pin 12d has a lock groove portion 30d with locking grooves 32d and a pull portion 34d with pull grooves 36d. The width Wg of the groove portions 57d of locking grooves 32d is greater than width Wg' of groove portions 57d' of pull grooves 36d. At the same time the width Ws' of lock groove shoulder portions 58d is less than the width Ws' of pull groove shoulder portions 58d'. In this way the lock groove portion 30d can be constructed to optimize the advantages of proportioned strength while the pull portion 34d can be optimized to provide ease of initial engagement by the nut member and adequate shear strength over a minimal length to resist the applied pull loads. Note that the thread pitch Pd can be maintained the same for both the threads on the lock groove portion 30d and on the pull portion 34d. In this case the collar thread, such as thread 56 in FIG. 7, can be constructed to accept the threads of both the lock groove portion 30d and the pull portion 36d. Note that in the construction shown in FIG. 11 the root diameter Drd is the same for both the threads of the lock groove portion 30d and the pull portion 36d. By the use of a nut member constructed generally as shown in FIG. 5, the ease of initial engagement will be further enhanced.

Another means of providing for a similar, balanced difference in threaded groove constructions would be to make the root of the pull grooves deeper thereby providing wider pull groove shoulders at the root. Such a construction is shown in FIG. 12 where components similar to like components in the embodiment of FIG. 11 are given the same numeral designation with the addition of the letter postscript "e".

Figure 12:
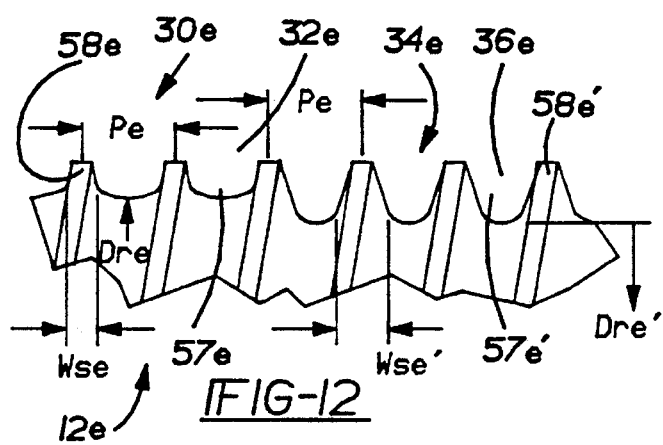
FIG. 12 is a fragmentary view to enlarged scale depicting a pin with still another combination of different thread forms for the pull groove portion and locking groove portion of the pin.

Looking now to FIG. 12, the pin 12e has a lock groove portion 30e with locking grooves 32e and a pull portion 34e with pull grooves 36e. The groove portions 57e' of pull grooves 36e are deeper than the groove portions 57e of locking grooves 32e and hence have a root diameter Dre' smaller than locking groove root diameter Dre. Thus the width Wse of lock groove shoulder portions 58e is less than the width Wse' of pull groove shoulder portions 58e'. In this way the lock groove portion 30e can again be constructed to optimize the proportioned strength advantages while the pull portion 34e can be optimized to provide adequate shear strength over a minimal length to resist the applied pull loads. With a nut member constructed generally as shown in FIG. 5, the ease of initial engagement will also be present. As with the prior embodiment, the thread pitch Pe can be maintained the same for both thread forms so as to accept the collar thread such as thread 56 of FIGS. 7–10.

Figure 13A:
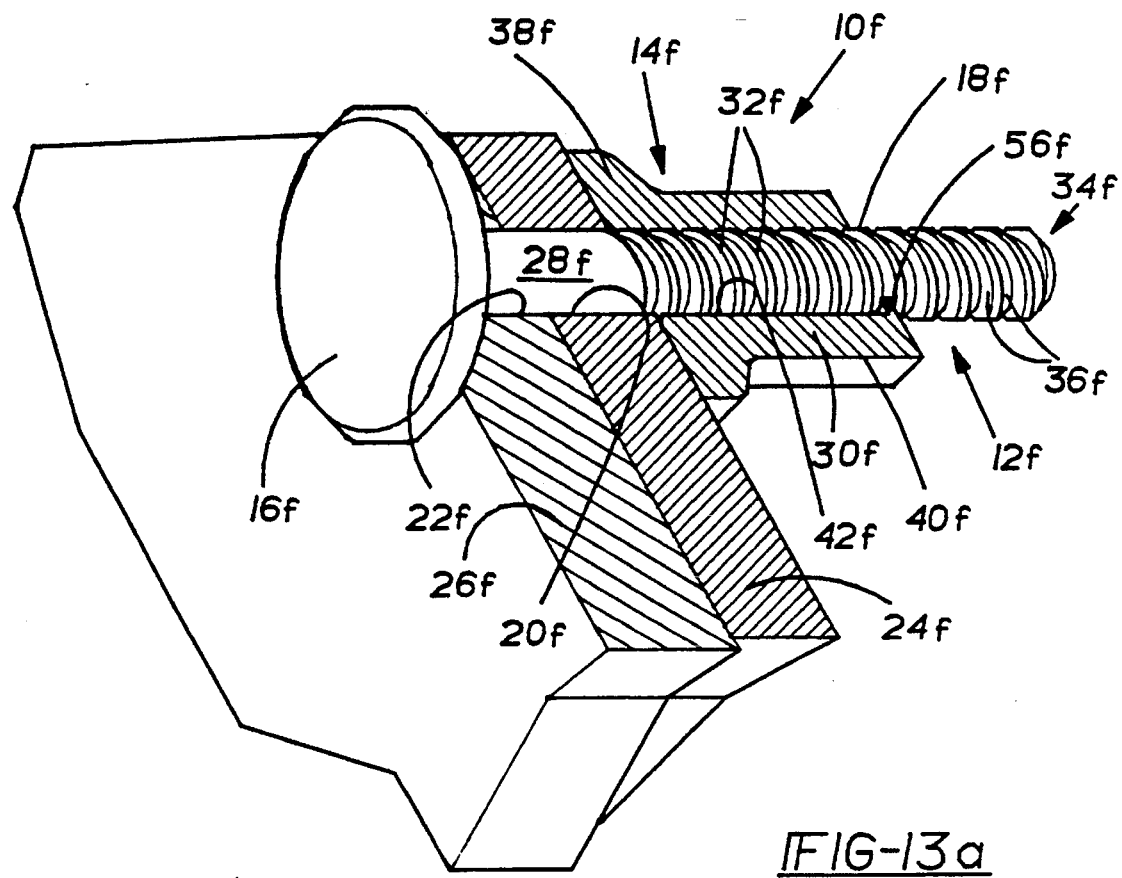
FIG. 13a is a pictorial view with some parts shown broken away and others shown in section of a modified swage fastener of a fit-up type including a collar with a flexible tab for engagement with a threaded pin.
Figure 13B:
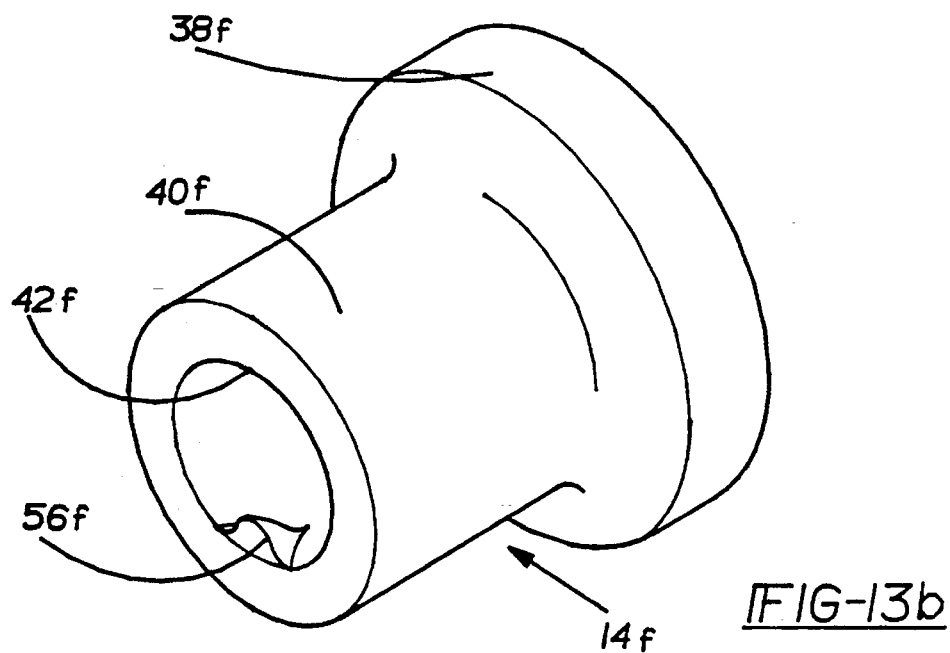

As noted another fit-up fastener construction could be used employing the flexible tab-like structure of the Smith patent (supra); such a construction is shown in FIG. 13 where components similar to like components in the embodiment of FIGS. 7 to 10 are given the same numerical designation with the addition of the letter postscript "f" and unless described otherwise are substantially identical with the like components of FIGS. 7 to 10.

Thus looking now to FIG. 13 fastener 10f is shown to include a pin member 12f and tubular collar 14f. Pin member 12f has an elongated shank 18f which extends through aligned openings 20f and 22f in a pair of workpieces 24f and 26f, respectively, to be secured together. An enlarged protruding head 16f at one end of shank 18f engages one side of workpiece 26f. Adjacent the head 16f, the shank 18f has a straight portion 28f which is adapted to be received within aligned bores 20f and 22f with a clearance fit. Following the straight portion 28f is a lock groove portion 30f defined by locking grooves 32f in the form of a continuous helical thread. The pin shank 18f terminates in a pull portion 34f defined by pull grooves 36f which are also in a helical thread form and can be a continuation of the thread form of lock grooves 32f.

The tubular collar 14f has a generally straight collar shank 40f terminating in an enlarged flange 38f. The collar 14f is provided with a flexible tab 56f located generally at the forward end of the collar shank 40f within smooth bore 42f.

In operation the pin 12f is located in the workpiece bores 20f and 22f and the collar 14f is located over the pin shank 18f. The flexible tab 56f extends radially inwardly sufficiently to engage the ridges of the lock grooves 32f. The tab 56f, however, being flexible can deform or bend over the ridges of the lock grooves 32f until the collar flange 38f engages the workpiece 24f. The tapered or wedge like construction of the flexible tab 56f facilitates movement of the collar 14f onto the pin 12f.

In some applications, it is advantageous to have the workpieces 24f and 26f lightly clamped or even loosely held together to permit an appropriate fit-up of the associated structure prior to final installation. After the pin 12f and collar 14f have been preassembled as noted the installation tool (such as tool 44c), is applied in the manner previously described, to the fastener 10f, by threading the nut member (such as 46c) onto the pull grooves 36f; next a relative axial force is applied between the pin 12f and collar 14f via the nut member (such as nut member 46c) gripping the pull groove portion 34f and the swage anvil (such as 50f) engaging the outer end of the shank 40f of collar 14f. As the relative axial force increases the flexible tab 56f will deform sufficiently to permit the collar 14f to move further axially relative to the pin 12f. The workpieces 24f and 26f can now be clamped together at a preselected preload by the relative axial force initially applied between the pin 12f and collar 14f and, as the axial force increases, the collar 14f is swaged into the lock groove portion 30f. Subsequently, upon further actuation of the tool the swaged collar 14f will be ejected from the anvil (such as 50f) and the nut member spun off thus completing the installation.

Note that the contour of the swage cavity of the anvil (such as 50c) and the contour of the outer end of the shank 40f of collar 14f are such that swaging of the collar 14f into the lock grooves 32f will not start to occur at the lower magnitude of relatively axial force required to deform, and in a sense to ratchet, the flexible tab 56f over the lock grooves 32f during the pull up of the workpieces 24f and 26f at the initiation of the swage operation.

Although a variety of materials would be suitable for the tab 56f, a flexible urethane of about a Shore A70 to around a Shore A90 hardness was found satisfactory. Another suitable material for tab 56f is an ethylene copolymer such as ethylene vinyl acetate of about a Shore A70 to around a Shore A90 hardness.

In some applications it may be desirable to provide the threads of the pull portion to be of a reverse hand to that of the lock groove portion. In this way, any tendency to turn the swaged collar threads off from the threaded locking grooves on removal of the nut member of the tool would be obviated. Such a construction is shown in FIG. 14 where components similar to like components in the embodiment of FIGS. 7 to 10 are given the same numeral designation with the addition of the letter postscript "g" and unless described otherwise are substantially identical with the like components of FIGS. 7 to 10.

Figure 14:
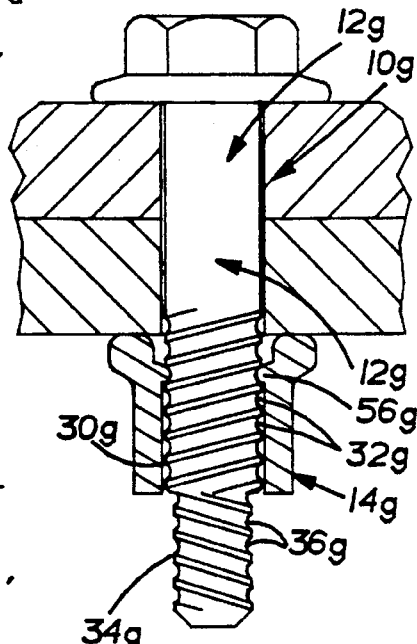
FIG. 14 is an elevational view of a swage type fastener having a modified pin structure where the locking groove and pull groove portions have opposite hand threads and with the pull groove portion being of a reduced diameter whereby a collar with a limited thread can be threaded onto the locking groove portion.

Thus looking now to FIG. 14, the pin 12g of fastener 10g has a lock groove portion 30g with the helical locking grooves 32g being in the form of a right hand thread. The pull portion 34g is provided with its helical pull grooves 36g in the form of an opposite or left hand thread. Thus after the completion of the swage step, when the nut member of the tool (not shown) is oppositely rotated to disengage from the helical pull grooves 36g on pull portion 34g the reaction on the pin 12g to the removal torque will tend to torque the pin 12g relative to the collar 14g to tighten the connection rather than loosen it. In the embodiment shown in FIG. 14, the pull portion 34g is of a reduced diameter relative to the lock groove portion 30g such that the limited collar thread 56g can be axially moved in clearance over the pull portion 34g and threaded onto the lock groove portion 30g. Where a non-threaded collar is used the pull portion 34g can be of the same diameter as the lock groove portion. This is shown in FIG. 15 where components similar to like components in the embodiment of FIG. 14 are given the same numeral designation with the addition of the letter postscript "h" and unless described otherwise are substantially identical with the like components of FIGS. 7 to 10 and 14.

Thus in FIG. 15 the pull portion 34h of pin 12h is of the same diameter as the lock groove portion 30h with the helical locking grooves 32h being of an opposite hand thread to the helical pull grooves 36h. The length of the pull portion 34h, however, is increased such that it will have at least one thread 61 in line with the collar shank 40h; in this way when the collar shank 40h is swaged onto the pin shank 18h some of the collar material will be swaged onto the opposite hand thread of the pull grooves 36h which will provide an anti-rotation feature resisting loosening from vibration. Note also that the combination of opposite hand threads will provide a substantially tamper proof joint. Note that a collar, such as collar 14f having a flexible tab 56f, could be used to provide the fit-up function regardless of the use of the combination of right and left hand threads of same diameter on pin shank 18h.

Another tamper proof construction is shown in FIG. 16 where components similar to like components in the embodiment of FIGS. 1 to 4 have been given the same numeral designation with the addition of the letter postscript "i" and unless described otherwise are substantially identical with the like components of FIGS. 1 to 4.

Looking now to FIG. 16 the lock groove portion 30i of pin 12i of fastener 10i can be formed with standard UNC or UNF threads and can be made of a material which is somewhat soft relative to the material of the collar 14i. Thus upon swaging the collar shank 40i into the lock groove portion 30i, the lock groove portion 30i will neck locally such that the diameter Dch in the center is less than the diameter Deh at opposite ends; this defines an "hourglass" or concave configuration which resists unthreading of the swaged collar 14i from the pin 12i. Such a construction can be provided where the pin 12i had a standard thread form and was of a ferrous material having a hardness of around 35 Rc and the collar 14i was of a ferrous material having a hardness of around 75 Rb. This relationship would differ for different thread forms such as the shallow lock grooves herein described. Localized necking has occurred in swage type fasteners with annular grooves but is generally avoided with threaded grooves where removability by unthreading is desired. The hour glass construction resists rotation and unthreading of the swaged collar 14$i$ from the pin 12$i$ such that the set fastener provides a tamper proof construction. The degree of concavity need not be extreme but in some cases will provide sufficient resistance to removal by torquing where the center diameter Dch has been reduced by at least around 2% relative to the end diameter Deh. Note that the threaded pull portion 34$i$ could be hardened, as previously noted, to increase the strength of the helical pull grooves 36$i$.

It is desirable that the pull portion be maintained as short as possible; yet the minimum length of the pull portion is dictated by the minimum number of pull grooves required to provide sufficient shear strength to withstand the pulling loads to set the fastener. In some constructions the pull portion can be defined by internal threads at the end of the pin shank adapted to be gripped by a threaded male mandrel. Such a construction is shown in FIG. 17 where components similar to like components in the embodiment of FIGS. 1 to 4 have been given the same numeral designation with the addition of the letter postscript "j". Thus looking now to FIG. 17, the pin 12$j$ of fastener 10$j$ has a lock groove portion 30$j$ extending generally over the outer end of the pin shank 18$j$. The outer end of pin shank 18$j$ is formed with an axial bore 64 defining the pull portion 34$j$; the bore 64 is provided with internal, female helical pull grooves 36$j$. The tool 44$j$ has an axially extending threaded male, mandrel 66 adapted to threadably engage the internal pull grooves 36$j$ whereby the relative axial force can be applied between internal pull grooves 36$j$ and the swage anvil member 50$j$ to set the fastener 10$j$ in the manner as described before. Thus with this construction the overall length of the pin shank 18$j$ can be minimized.

In another form of the invention the pull portion of the pin can be defined by a combination of external and internal threads. Such a construction is shown in FIG. 18, where components similar to like components in the embodiments of FIGS. 1–4 and 17 are given the same numeral designation with the addition of the letter postscript "k". Thus looking now to FIG. 18, the fastener 10$k$ has pin 12$k$ a lock groove portion 30$k$ terminating in a limited pull portion 34$k$ having external helical pull grooves 36$k$ and internal helical pull grooves 36$k'$ in an axial bore 64$k$. The tool 44$k$ in addition to having nut member 46$k$ which will engage the external, helical pull grooves 36$k$ is provided with an axially extending threaded male, mandrel 66$k$ adapted to engage the internal pull grooves 36$k'$. The mandrel 66$k$ is separate from the nut member 46$k$ so that each are threaded separately onto the mating internal pull grooves 36$k'$ and external pull grooves 36$k$, respectively. The combination of internal and external pull grooves will also permit the use of a pull portion 34$k$ of minimal length resulting in pin shank 18$k$ being minimal in length.

Figure 19:
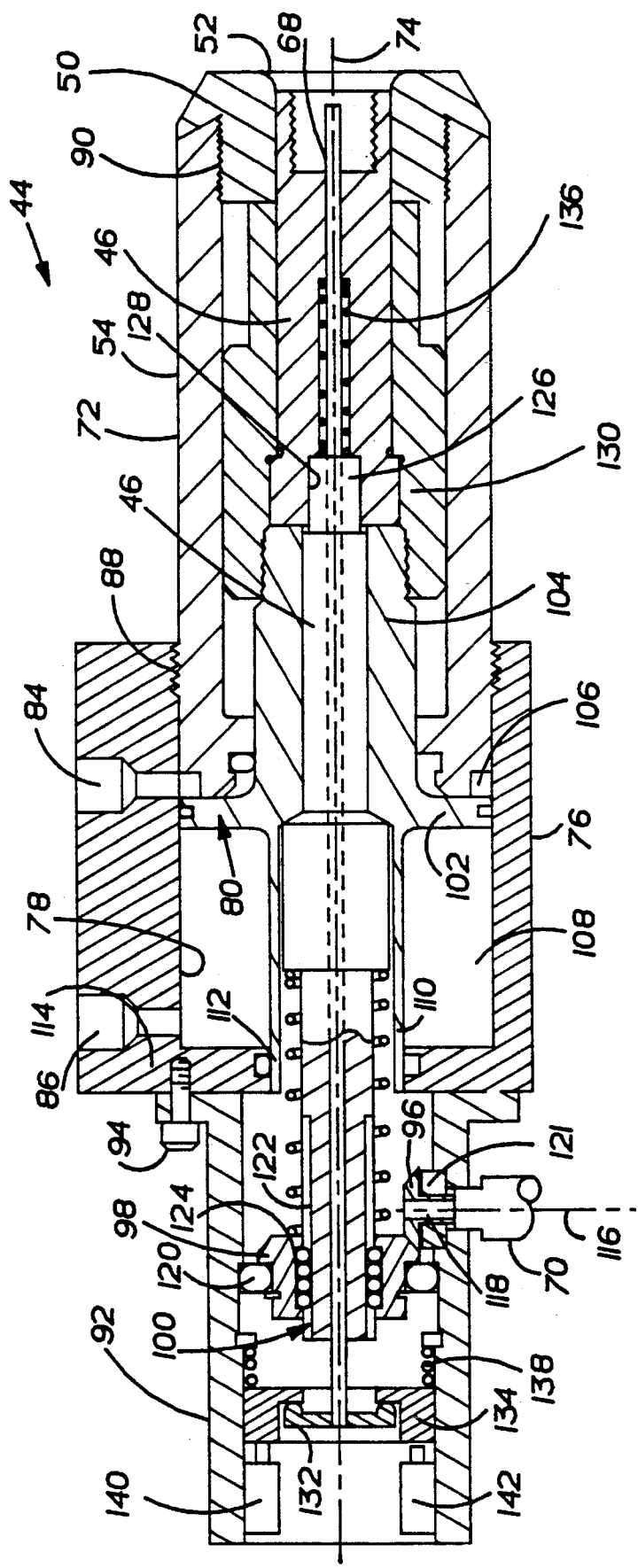
FIG. 19 is a drawing depicting the installation apparatus of the present invention and including a longitudinal sectional view of an installation tool for use with the controller system shown in FIG. 20.

The tool 44 also represents a unique element of the fastening system of the present invention and is shown in greater detail in FIG. 19. FIG. 19 illustrates structural features of the tool 44 operating in accordance with the sequence shown in FIGS. I through 4 and is shown in combination with a control system 67 shown in FIG. 20 to be described.

Thus looking to FIGS. 19 and 20 and FIGS. 1–4, the tool 44 has a sensing rod 68 which extends axially through nut member 46 to detect the extent that the nut member 46 has been moved onto the pull portion 34 of pin shank 18. As the nut member 46 is rotated by a reversible air motor 70 it advances axially on the pull portion 34 until sensing rod 68 contacts the end surface of pin shank 18 and is moved axially rearwardly relative to nut member 46. The rearward movement of sensing rod 68 and/or a timer is used to determine actuation of a source of compressed air 71 for the motor 70 that rotates nut member 46. The movement of sensing rod 68 may also be used to determine actuation of a fluid power source 69 to move anvil member 50 axially relative to nut member 46 such that it will first engage the outer end of the collar shank 40 to apply an initial preload to the workpieces 24 and 26 and then upon continued actuation will move axially to radially overengage the collar 14 swaging it into locking grooves 32 on the pin shank 18.

The tool 44 includes an elongated annular housing assembly 72 having a central, longitudinal axis 74. The housing assembly 72 has a cylinder housing 76 internally contoured to form a fluid cylinder cavity 78. A piston 80 is disposed within cylinder housing 76 for reciprocating movement in the cylinder cavity 78 in response to selective introduction of hydraulic fluid through ports 84 and/or 86 in the cylinder housing 76. Cylinder housing 76 is threadably connected to outer anvil housing 54 via a threaded connection 88 and hence is connected to swage anvil member 50 whereby the piston 80 will move axially relative to the anvil member 50 as shown in FIGS. 1 through 4 to swage collar 14 onto pin 12. Swage anvil member 50 is also threadably connected to the forward end of outer anvil housing 54 via a threaded connection 90. Housing assembly 72 also includes rear housing member 92 which is affixed to the cylinder housing 76 via a ring of bolts 94.

The nut member 46 is rotatably mounted within the swage cavity 52 of anvil member 50. Nut member 46 is rotatably driven around the tool axis 74 by the reversible air motor 70. The drive system includes a first bevel gear 96, a second bevel gear 98, and an elongated drive shaft 100. Shaft 100 extends axially through piston 80 but can rotate relative thereto to impart the rotary drive force to nut member 46.

Fluid piston 80 includes a piston head 102 and a piston rod 104 with the piston head 102 dividing the fluid cylinder cavity 78 into forward and rearward chambers 106 and 108, respectively. A tubular extension 110 extends rearwardly from piston head 102 through a bore 112 in the end wall 114 of cylinder housing 76. Introduction of pressurized hydraulic fluid through port 84 into the forward cylinder chamber 106 causes a hydraulic force to be exerted on the forward or rod end of piston 80 to drive the piston 80 axially rearwardly relative to housing assembly 72. Introduction of pressurized fluid through port 86 into the rearward cylinder chamber 108 causes a hydraulic force to be applied to the rearward or head end of piston 80 causing it to move axially forwardly, i.e. to the position shown in FIGS. 1 and 19.

Air motor 70 is attached to rear housing member 92 in a radial orientation such that the motor rotational axis 116 extends radially or transversely from central housing axis 74. A motor shaft 118 carries the first bevel gear 96 that meshes with the second bevel gear 98 supported in anti-friction bearings 120 for rotation around central housing axis 74 while anti-friction bearings 121 support the first bevel gear 96 for rotation around its axis 116. Drive shaft 100 is splined with grooves 122 to mate with ball splines 124 on second bevel gear 98, such that gear 98 can transmit a rotary drive force to drive shaft 100 and the drive shaft 100 can move axially relatively thereto along central housing axis 74.

Drive shaft 100 extends forwardly from second gear 98 through piston 80. The extreme forward end of drive shaft 100 is configured as a square cross-sectioned male drive element 126 seatable within a similarly sectioned socket 128 formed in the confronting end face of nut member 46. The outer side surfaces of nut member 46 are cylindrical surfaces slidably and rotatably mounted within the swage cavity 50 of swage anvil 36. An annular sleeve 130 carried by the piston rod 104 blocks nut member 46 from axial motion while permitting the nut member 46 to rotate relatively thereto around central housing axis 74.

The elongated, non-rotary position sensing rod 68 extends through nut member 46 and elongated drive shaft 100. The rearward end of sensing rod 68 is attached to a disk 132 that is located within an annular ring structure 134 of a stepped construction and which is axially slidable within rear housing member 92. A coil spring 136 within nut member 46 biases sensing rod 68 rearwardly to the position shown in FIGS. 1 and 19.

During rotary motion of nut member 46 onto pin pull portion 34 (FIG. 2) and in response to its axial movement onto the pin shank 18, sensing rod 68 engages the end face of the pin shank 18. The rod 38 is thus moved rearwardly (as in FIG. 2) so that disk 132 moves rearwardly a slight distance. This slight movement permits a light spring 138 to slide ring structure 134 rearwardly in a manner to sequentially operate two electric position sensing switches 140 and 142. The second switch 142 is located a very slight distance to the rear of the first switch 140 such that first switch 140 is actuated before second switch 142. For example, the first position switch 140 would be actuated when nut member 46 was only partially threaded onto the threads of pull portion 34, i.e. only two threads instead of the desired four threads; on the other hand the second position switch 142 would be actuated only after the nut member 46 had been fully threaded the desired amount onto the threads of the pull portion 34, i.e. four threads.

Thus the actuation point for second switch 142 is predetermined and can be selected so that nut member 46 will be threaded a known distance onto the threads of pull portion 34 such that a sufficient number of threads on the pull portion 34 are engaged to fully accept the reaction loads for the swaging of the collar 14 into the lock groove portion 30.

Position switches 140, 142 are incorporated into the controller system 67 which includes a programmable controller 144; the programmable controller 144 includes a manually actuable trigger switch 146 actuable by the operator for initiating the installation cycle by energizing motor 70 via air supply 71 and starting a timer 148. Assuming that the second position switch 142 is actuated within the time period allowed by the timer 148, i.e. approximately one or two seconds, the programmable controller 144 will signal the air supply 71 to de-energize motor 70 and then energize a solenoid valve 150 controlling flow of hydraulic fluid from the fluid pressure supply 69 to port 84 (FIG. 19). With motor 70 and nut member 46 motionless, the hydraulic fluid will act on the rod end of piston 80 to effectively move the tool housing assembly 72 forwardly, thereby moving anvil 36 forwardly relative to nut member 46 to perform the swaging operation on collar 14. In this mode the high pressure output line from fluid source 69 will be connected to the solenoid valve 150 via control valve 151.

As the anvil 36 reaches the end of the swage stroke it generates high back pressure on the fluid in the line leading to port 84. The high back pressure operates a second fluid pressure switch 154 to signal the programmable controller 144 to actuate the solenoid valve 150 to its original condition relative to ports 84 and 86. Port 84 is thus connected to a drain or return line, while port 86 is connected to the high pressure side of the fluid pressure source 69 until return and then held there under a low idle pressure. Accordingly, housing assembly 72 is returned rearwardly to its FIG. 2 position ejecting the swaged collar 14 from the swage cavity 52 of anvil 50. A second fluid pressure switch 154 in the line leading to port 86 responds to back pressure to signal the programmable controller 144 to energize motor 70 via the air source 71 in the reverse direction, whereby nut member 46 is spun off of the threads on pull portion 34 to approximate the condition shown in FIG. 1.

First position switch 140 is in the nature of a safety switch to enable the programmable controller 144 to provide a second chance at achieving a collar swage action if nut member 46 is initially threaded an insufficient distance onto pin pull portion 34. In this case, if the timer 148 times out and first position switch 140 is actuated but second position switch 142 is not actuated this signifies a minimal but insufficient threading of nut member 46 onto pull portion 34. The time period for the first actuation of first switch 140 is around 5 to 10 second. If switch 140 is not actuated in that time period the controller 144 will abort the cycle and bring the system 67 back to its original state requiring another actuation of the trigger switch 144. Thus in response to these signals from switches 140 and 142 and timer 148 the programmable controller 144 actuates the solenoid valve 150 to provide hydraulic fluid at a predetermined low, holding pressure to port 84. This holding pressure will be less than the full pressure for swage but of a sufficient, low magnitude only to move swage anvil 50 against the end of collar shank 40 to take up the gap between workpieces 24 and 26. In this regard the first fluid pressure switch 152 senses the magnitude of pressure to port 84 and will generate a signal when the low holding pressure is attained; in response the controller 144 will interrupt the cycle and return the piston 80 to its return position. Thus when the gap is taken up, the programmable controller 144 will have returned the piston 80 to its original position and will again initiate the timer 148 to give motor 70 a second chance to thread nut member 46 the required distance onto pull portion 34. If second position switch 142 is now actuated on the second attempt, then the swaging operation will be carried out in the desired fashion as previously described. If the second switch 142 is not actuated on the second attempt, the programmable controller 144 will return the controller system 67 to its return condition, reversing the pressure at ports 84 and 86 and actuating the air supply 71 to unthread the nut member 46 from the pull portion 34.

Thus the controller system 67 is designed so that the swaging operation will not be attempted until after second position switch 142 has been actuated, i.e., until the system is assured that nut member 46 has been threaded a sufficient distance onto pull portion 34 to adequately resist the axial loads imposed by the swaging operation.

In a similar manner controller system 67 will not initiate the actuation of the pull up of the workpieces via the low holding pressure if first position switch 140 is not actuated within a time prescribed by timer 148, i.e. less than around two threads engaged. Again the nut member 46 will be unthreaded from pull portion 34 without the application of fluid pressure and without application of a relative axial pulling force to the fastener 10.

Figure 20:
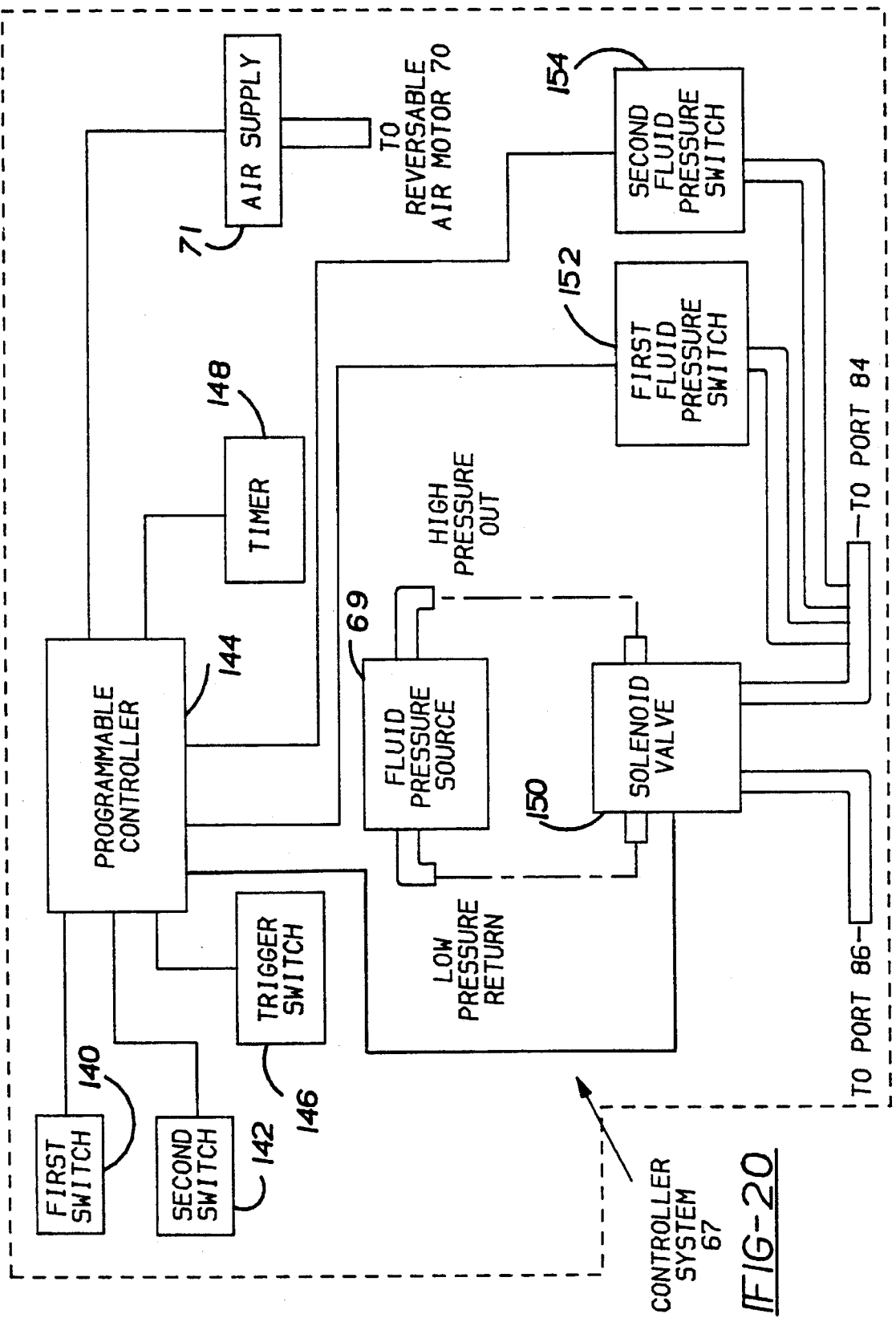
FIG. 20 is a block diagram of a controller system including portions of the installation tool of FIG. 19 and embodying features of the present invention.

In the system of FIGS. 19 and 20 a reversible air motor 70 of a type Model No. MMR-0002X by Micro Motors, Inc. of Santa Ana, Calif., U.S.A. was utilized; at the same time a programmable controller 144 of a type produced by DeVilbiss U.S.A. was used and can be programmed to provide the noted sequence of operation by one skilled in the art.

FIG. 21 illustrates the operation of another tool embodying the invention. In the embodiment of FIG. 21 components similar to like components in the embodiment of FIGS. 1 through 4 and 19 are given the same numeral designation with the addition of the letter postscript "m" and unless described otherwise are substantially identical with the like components of FIGS. 1 to 4 and 19. In this case there is no position sensing rod 68. Instead, nut member 46 m of tool 44 m is rotated until the end face 156 of the nut member cavity 158 abuts against the end surface of pin shank 18 m. When this occurs a back pressure is developed at a reversible air motor (such as motor 70) used to rotate nut member 46 m. Such a back pressure can be sensed by the controller system (such as system 67) and upon attainment of a known magnitude can generate a signal to stop the air motor. After nut member 46 m stops rotating, the swage anvil member 50 m is driven axially and radially over the collar 14 m to swage the collar material into the threads of lock groove portion 30 m on pin shank 18 m. Thus the operation of the tool 44 m is generally similar to that of the tool 44 in FIG. 19, one difference being that the magnitude of air pressure on the motor (such as 70) is sensed instead of nut position on the pin via a sensing rod 68 and such pressure signal is used to halt rotation of nut member 46 m. In this case, however, the repeatability factor noted with the embodiment of FIG. 19 will not be present.

It should be noted that other groove forms could be used for the locking grooves and pull grooves. For example the pull grooves could be in the form of a multiple thread; with a mating thread on the nut member the full engagement could occur with fewer turns of the nut member.

Also the pull portion of the pin could be color coded so as to provide a visual indication to the operator that the tool nut member has engaged a sufficient number of pull grooves and/or that the pull groove portion extends the desired distance beyond the end of the collar shank.

While it will be apparent that the preferred embodiments of the invention disclosed is/are well calculated to fulfill the objects above stated, it will be appreciated that the invention is susceptible to modification, variation and change without departing from the proper scope or fair meaning of the invention.

What is claimed is:

1. In a fastening system for securing a plurality of workpieces with a multi-piece swage type fastener through aligned openings in the workpieces, the method comprising:

a. providing a pin member with an elongated pin shank and an enlarged head, b. providing said pin member with a locking groove portion on said pin shank comprising a plurality of generally circumferentially extending locking grooves, c. locating said pin member with said pin shank extending through the aligned openings, d. providing said pin member with a pull portion comprising a plurality of generally circumferentially extending pull grooves, e. said pull portion located at the terminal end of said pin shank with said pull grooves defining a thread form, f. providing a tubular collar and locating said collar on said pin shank surrounding said locking grooves with said pull grooves being accessible at an outer end of said collar, g. providing a gripping member adapted to threadably engage and grip said pull grooves, h. providing a swage anvil operatively associated with said gripping member and adapted to engage said collar and to radially overengage said collar to swage it into said locking grooves in response to a relative axial force of a first magnitude, i. threadably engaging said pull grooves with said gripping member, j. automatically detecting the extent of relative engagement of said pull grooves by said gripping member, thereby determining a first extent or a second extent of relative engagement, with said first extent being greater than said second extent, k. if said first extent is sensed then automatically applying a relative axial force between said gripping member and said swage anvil of a first magnitude, thereby swaging said collar into said locking grooves and clamping the workpieces together via said pin and said collar under a final clamp load, and then removing said swage anvil from said collar and unthreading said gripping member from said pull portion with said pull portion remaining integral with said pin, l. if said first extent is not sensed but said second extent is sensed then automatically applying a relative axial force of a second magnitude between said gripping member and said swage anvil, thereby pulling the workpieces together under an initial clamp load, said second magnitude being less than said first magnitude and less than that at which initiation of swaging of said collar into said lock grooves of said pin occurs, and after application of the relative axial force of said second magnitude applying a rotary force, thereby threading said gripping member further onto said pull groove portion until said first extent is attained and then repeating step k.

2. In a fastening system for securing a plurality of workpieces with a multi-piece swage type fastener through aligned openings in the workpieces, the method comprising:

a. providing a pin member with an elongated pin shank and an enlarged head, b. providing said pin member with a locking groove portion on said pin shank comprising a plurality of generally circumferentially extending locking grooves, c. locating said pin member with said pin shank extending through the aligned openings, d. providing said pin member with a pull portion comprising a plurality of generally circumferentially extending pull grooves, e. said pull portion located at the terminal end of said pin shank with said pull grooves defining a thread form, f. providing a tubular collar and locating said collar on said pin shank surrounding said locking grooves with said pull grooves being accessible at an outer end of said collar, g. providing a gripping member adapted to threadably engage and grip said pull grooves, h. providing a swage anvil operatively associated with said gripping member and adapted to engage said collar and to radially overengage said collar to swage it into said locking grooves in response to a relative axial force of a first magnitude, i. threadably engaging said pull grooves with said gripping member, j. automatically detecting the extent of relative engagement of said pull grooves by said gripping member, thereby determining a first extent of relative engagement, k. if said first extent is equal to a predetermined value, then automatically applying a relative axial force between said gripping member and said swage anvil of a first magnitude, thereby swaging said collar into said locking grooves and clamping the workpieces together via said pin and said collar under a final clamp load, and after swaging of the collar removing said swage anvil from said collar and unthreading said gripping member from said pull portion, l. if said first extent is less than said predetermined value then automatically inhibiting application of the relative axial force of said first magnitude.

3. In a fastening system for securing a plurality of workpieces with a multi-piece swage type fastener through aligned openings in the workpieces, the method comprising:

a. providing a pin member with an enlarged head and an elongated pin shank, b. providing said pin member with a locking groove portion on said pin shank comprising a plurality of generally circumferentially extending locking grooves, c. locating said pin member with said pin shank extending through the aligned openings, d. providing said pin member with a pull portion comprising a plurality of generally circumferentially extending pull grooves, e. said pull portion located at the terminal end of said pin shank with said pull grooves defining a thread form, f. providing a tubular collar and locating said collar on said pin shank surrounding said locking grooves with said pull grooves being accessible at an outer end of said collar, g. providing a gripping member adapted to threadably engage and grip said pull grooves, h. providing a swage anvil operatively associated with said gripping member and adapted to engage said collar and to radially overengage said collar to swage it into said locking grooves in response to a relative axial force of a first magnitude, i. threadably engaging said pull grooves with said gripping member, j. automatically detecting the extent of relative engagement of said pull grooves by said gripping member, thereby determining extent of relative engagement, k. if relative engagement no greater than said preselected extent is sensed then preventing the application of relative axial force of the first magnitude, l. if said preselected extent is sensed and the relative axial force of first magnitude has not been applied, then applying a relative axial force of a second magnitude between said gripping member and said swage anvil to pull the workpieces together under an initial clamp load, eaid second magnitude being less than said first magnitude and less than that at which initiation of swaging of said collar into said lock grooves of said pin occurs, m. after application of the relative axial force of said second magnitude applying a rotary force for threading said gripping member further onto said pull groove portion while inhibiting application of the relative axial force of first magnitude, n. after said gripping member has been threaded further onto said pull portion applying a relative axial force between said gripping member and said swage anvil of said first magnitude, thereby swaging said collar into said locking grooves.

4. In a fastening system for securing a plurality of workpieces with a multi-piece swage type fastener with the workpieces including an inner workpiece and at least one outer workpiece, the fastener comprising a pin member and a tubular collar and adapted to be set by a relative axial force therebetween, the pin member having an elongated pin shank with a locking groove portion on the pin shank, means operatively connecting the pin shank in load bearing relationship with the inner workpiece and with the pin shank adapted to extend through an aligned opening in the outer workpiece, the pin shank having a pull portion comprising a plurality of generally circumferentially extending pull grooves, the pull portion located at the terminal end of the pin shank with the pull grooves defined by a thread form, the tubular collar adapted to be located on the pin shank surrounding the locking grooves with the pull grooves being accessible at an outer end of the collar, the method of setting the fastener comprising:

progressively threadably engaging the pull grooves generally one a a time by a gripping member, engaging the collar by a swage anvil as the pull grooves are threadably engaged by the gripping member, and in a first installation step applying a relative axial force of a first magnitude between the pin member and the collar by the gripping member and the swage anvil hereby swaging the collar into the locking grooves or alternatively and in a second installation step and prior to applying the relative axial force of the first magnitude applying a relative axial force of a second magnitude being less than the first magnitude to pull the workpieces together, automatically detecting the extent of relative threaded engagement between the pull grooves and the gripping member as the gripping member is threadably engaging the pull grooves, automatically preventing the application of the relative axial force of the second magnitude for the second installation step unless a preselected minimum extent of the final relative threaded engagement of the pull grooves by the gripping member is automatically detected and at the same time preventing the application of relative axial force of first magnitude for the first installation step, and for the second installation step automatically applying the relative axial force of the second magnitude if the preselected minimum extent of the final relative thread engagement is detected.

5. The fastening system of claim 4 with the method of setting the fastener further comprising:

automatically unthreading the gripping member from the pull grooves if the preselected minimum extent of threaded engagement has not been attained by the gripping member within a predetermined time period.

6. In a fastening system for securing a plurality of workpieces with a multi-piece swage type fastener with the workpieces including an inner workpiece and at least one outer workpiece, the fastener comprising a pin member and a tubular collar and adapted to be set by a relative axial force therebetween, the pin member having an elongated pin shank with a locking groove portion on the pin shank, means operatively connecting the pin shank in load bearing relationship with the inner workpiece and with the pin shank adapted to extend through an aligned opening in the outer workpiece, the pin shank having a pull portion comprising a plurality of generally circumferentially extending pull grooves, the pull portion located at the terminal end of the pin shank with the pull grooves defined by a thread form, the tubular collar adapted to be located on the pin shank surrounding the locking grooves with the pull grooves being accessible at an outer end of the collar, the method of setting the fastener comprising:

progressively threadably engaging the pull grooves generally one at a time by a gripping member, automatically detecting the extent of relative threaded engagement between the pull groove and the gripping member as the gripping member is threadably engaging the pull grooves, engaging the collar by a swage anvil as the pull grooves are threadably engaged by the gripping member, the swage anvil adapted to engage the collar thereby swaging it into the locking grooves in response to a relative axial force of a first magnitude applied between the pin member and the collar by the gripping member and the swage anvil, automatically preventing the application of the relative axial force of the first magnitude unless a predetermined maximum extent of relative threaded engagement of the pull grooves by the gripping member is automatically detected, and automatically applying the relative axial force of the first magnitude if the predetermined maximum extent of relative threaded engagement is detected.

7. The fastening system of claim 6 with the method of setting the fastener further comprising:

automatically halting the step of progressively engaging the pull grooves and automatically preventing the application of the relative axial force of the first magnitude unless the preselected maximum extent of threaded engagement has been detected within a predetermined time period.

8. In a fastening system or securing a plurality of workpieces with a multi-piece swage type fastener with the workpieces including an inner workpiece and at least one outer workpiece, the fastener comprising a pin member and a tubular collar and adapted to be set by a relative axial force therebetween, the pin member having an elongated pin shank with a locking groove portion on the pin shank, means operatively connecting the pin shank in load bearing relationship with the inner workpiece and with the pin shank adapted to extend through an aligned opening in the outer workplace, the pin shank having a pull portion comprising a plurality of generally circumferentially extending pull grooves, the pull portion located at the terminal end of the pin shank with the pull grooves defined by a thread form, the tubular collar adapted to be located on the pin shank surrounding the locking grooves with the pull grooves being accessible at an outer end of the collar, the method of setting the fastener comprising:

progressively threadably engaging the pull grooves generally one at a time by a gripping member, automatically detecting the extent of relative threaded engagement between the pull grooves an the gripping member as the gripping member is threadably engaging the pull grooves, engaging the collar by a swage anvil as the pull grooves are threadably engaged by the gripping member, the swage anvil adapted to engage the collar thereby swaging it into the locking grooves in response to a relative axial force of a first magnitude applied between the pin member and the collar by the gripping member and the swage anvil or alternatively and prior to applying the relative axial force of the first magnitude applying a relative axial force of a second magnitude being less than the first magnitude to pull the workpieces together, after a preselected maximum extent of relative threaded engagement of the pull grooves by the gripping member has been automatically detected applying a relative axial force of the first magnitude, thereby swaging the collar into the locking groove, automatically preventing the application of the relative axial force of the first magnitude unless the preselected maximum extent of relative threaded engagement of the pull grooves by the gripping member has been automatically detected, automatically preventing the application of the relative axial force of the second magnitude unless a preselected minimum extent of final relative threaded engagement of the pull grooves by the gripping member is automatically detected with said preselected minimum extent being less than said preselected maximum extent.

9. The fastening system of claim 8 with the method of setting the fastener further comprising:

automatically unthreading the gripping member from the pull grooves if the preselected minimum extent of threaded engagement has not been attained by the gripping member within a predetermined time period.

10. The fastening system of claim 8 with the method of setting the fastener further comprising:

automatically halting the step of progressively engaging the pull grooves and automatically preventing the application of the relative axial force of the first magnitude unless the preselected maximum extent of threaded engagement has been detected within a predetermined time period.

11. The fastening system of claim 8 with the method of setting the fastener further comprising:

automatically unthreading the gripping member from the pull grooves if the preselected minimum extent of threaded engagement has not been attained by the gripping member within a predetermined time period, automatically halting the step of progressively engaging the pull grooves and automatically preventing the application of the relative axial force of the first magnitude unless the preselected maximum extent of threaded engagement has been detected within a predetermined time period.

12. In a fastening system for securing a plurality of workpieces with a multi-piece swage type fastener with the workpieces including an inner workpiece and at least one outer workpiece, the fastener comprising a pin member and a tubular collar and adapted to be set by a relative axial force therebetween, the pin member having an elongated pin shank with a locking groove portion on the pin shank, means operatively connecting the pin shank in load bearing relationship with the inner workpiece and with the pin shank adapted to extend through an aligned opening in the outer workpiece, the pin shank having a pull portion comprising a plurality of generally circumferentially extending pull grooves, the pull portion located at the terminal end of the pin shank with the pull grooves defined by a thread form, the tubular collar adapted to be located on the pin shank surrounding the locking grooves with the pull grooves being accessible at an outer end of the collar, the method of setting the fastener comprising:

progressively threadably engaging the pull grooves generally one at a time by a gripping member, engaging the collar by a swage anvil as the pull grooves are threadably engaged by the gripping member, the swage anvil adapted to engage the collar and swage it into the locking grooves in response to a relative axial force of a first magnitude applied between the pin member and the collar by the gripping member and the swage anvil or alternatively and prior to applying the relative axial force of the first magnitude applying a relative axial force of a second magnitude being less than the first magnitude to pull the workpieces together, automatically detecting the extent of relative engagement of the pull grooves by the gripping member, thereby determining a first extent or a second extent of relative engagement, with the first extent being greater than the second extent, if the first extent is detected then automatically applying the relative axial force between the gripping member and the swage anvil of the first magnitude, thereby swaging the collar into the locking grooves and clamping the workpieces together via the pin and the collar under a final clamp load, automatically preventing the application of the relative axial force of the first magnitude unless the first extent of relative threaded engagement of the pull grooves by the gripping member is automatically detected, if the first extent is not detected but the second extent is detected then automatically applying a relative axial force of the second magnitude between the gripping member and the swage anvil, thereby pulling the workpieces together under an initial clamp load, the second magnitude being less than that at which initiation of swaging of the collar into the lock grooves of the pin occurs, and after application of the relative axial force of the second magnitude applying a rotary force, thereby threading the gripping member further onto the pull groove portion and if the first extent is detected then automatically applying the relative axial force between the gripping member and the swage anvil of the first magnitude, automatically preventing the application of the relative axial force of the second magnitude unless the second extent of relative threaded engagement of the pull grooves by the gripping member is automatically detected.

13. The fastening system of claim 12 with the method of setting the fastener further comprising:

automatically halting the step of progressively engaging the pull grooves and automatically preventing the application of the relative axial force of the first magnitude unless the first extent of threaded engagement has been detected within a predetermined time period.

14. The fastening system of claim 12 with the method of setting the fastener further comprising:

automatically unthreading the gripping member from the pull grooves if the preselected second extent of threaded engagement has not been attained by the gripping member within a predetermined time period.

15. The fastening system of claim 12 with the method of setting the fastener further comprising:

automatically unthreading the gripping member from the pull grooves if the preselected second extent of threaded engagement has not been attained by the gripping member within a predetermined time period, automatically halting the step of progressively engaging the pull grooves and automatically preventing the application of the relative axial force of the first magnitude unless the first extent of threaded engagement has been detected within a predetermined time period.

16. The fastening system of claim 12 with the method of setting the fastener further comprising:

automatically unthreading the gripping member from the pull grooves if the first extent of threaded engagement has not been attained by the gripping member after detection of the second extent of threaded engagement and the automatic application of the relative axial force of second magnitude has been made a preselected number of times.

17. The fastening system of claim 12 with the method of setting the fastener further comprising:

automatically unthreading the gripping member from the pull grooves if the first extent of threaded engagement has not been attained by the gripping member after detection of the second extent of threaded engagement and the automatic application of the relative axial force of second magnitude has been made.

18. In a fastening system for securing a plurality of workpieces with a multi-piece swage type fastener with the workpieces including an inner workplace and at least one outer workpiece, the fastener comprising a pin member and a tubular collar and adapted to be set by a relative axial force therebetween, the pin member having an elongated pin shank with a locking groove portion on the pin shank, means operatively connecting the pin shank in load bearing relationship with the inner workplace and with the pin shank adapted to extend through an aligned opening in the outer workpiece, the pin shank having a pull portion comprising a plurality of generally circumferentially extending pull grooves, the pull portion located at the terminal end of the pin shank with the pull grooves defined by a thread form, the tubular collar adapted to be located on the pin shank surrounding the locking grooves with the pull grooves being accessible at an outer end of the collar, the method of setting the fastener comprising:

progressively threadably engaging the pull grooves generally one at a time by a gripping member, engaging the collar by a swage anvil as the pull grooves are threadably engaged by the gripping member, the swage anvil adapted to engage the collar and swage it into the locking grooves in response to a relative axial force of a first magnitude applied between the pin member and the collar by the gripping member and the swage anvil or alternatively and prior to applying the relative axial force of the first magnitude applying a relative axial force of a second magnitude being less than the first magnitude to pull the workpieces together, automatically detecting the extent of relative engagement of the pull grooves by the gripping member, thereby determining a first extent or a second extent of relative engagement, with the first extent being greater than the second extent, if the first extent is detected then automatically applying the relative axial force between the gripping member and the swage anvil of the first magnitude, thereby swaging the collar into the locking grooves and clamping the workpieces together via the pin and the collar under a final clamp load, automatically preventing the application of the relative axial force of the first magnitude unless the first extent of relative threaded engagement of the pull grooves by the gripping member is automatically detected, if the first extent is not detected but the second extent is detected then automatically applying a relative axial force of the second magnitude between the gripping member and the swage anvil, thereby pulling the workpieces together under an initial clamp load, the second magnitude being less than that at which initiation of swaging of the collar into the lock grooves of the pin occurs, and after application of the relative axial force of the second magnitude applying a rotary force, thereby threading the gripping member further onto the pull groove portion and if the first extent is detected then automatically applying the relative axial force between the gripping member and the swage anvil of the first magnitude, automatically preventing the application of the relative axial force of the second magnitude unless the second extent of relative threaded engagement of the pull grooves by the gripping member is automatically detected, automatically halting the step of progressively engaging the pull grooves and automatically preventing the application of the relative axial force of the first magnitude unless the first extent of threaded engagement has been detected within a predetermined time period, automatically unthreading the gripping member from the pull grooves if the preselected second extent of threaded engagement has not been attained by the gripping member within a predetermined time period, automatically unthreading the gripping member from the pull grooves if the first extent of threaded engagement has not been attained by the gripping member after detection of the second extent of threaded engagement and the automatic application of the relative axial force of second magnitude has been made a preselected number of times.

* * * * *

UNITED STATES PATENT AND TRADEMARK OFFICE
CERTIFICATE OF CORRECTION

PATENT NO. : 5,604,968                         Page 1 of 3

DATED : February 25, 1997

INVENTOR(S) : D. J. Fulbright & W. J. Smith

It is certified that error appears in the above-indentified patent and that said Letters Patent is hereby corrected as shown below:

Col. 1, line 22, "Muck" should be --Huck--.

Col. 11, line 4, "houlder" should be --shoulder--.

Col. 12, line 16 "Ws'" should be --Ws--.

Col. 18, line 20, "second" should be --seconds--.

Col. 21, line 45, Claim 3 "a preselected" should be --an--.

Col. 21, line 45, Claim 3 after "if" insert --said extent of--.

Col. 21, line 45, Claim 3 after "engagement" insert --is--.

Col. 21, line 45, Claim 3 "said" should be --a--.

Col. 21, line 46, Claim 3 "extent is sensed" should be --value--

Col. 21, line 48, Claim 3 delete "preselected".

Col. 21, line 48, Claim 3 "is sensed" should be --of relative engagement is equal to said preselected value--.

Col. 21, lines 51-52, Claim 3 "to pull" should be --thereby pulling--.

Col. 21, line 53, Claim 3 "eaid" first occurrence should be --said--.

Col. 21, line 56, Claim 3 after "," insert --after application of the relative axial force of said second magnitude applying a rotary force thereby threading said gripping member further onto said pull groove portion while inhibiting application of the relative axial force of first magnitude,--.

UNITED STATES PATENT AND TRADEMARK OFFICE
CERTIFICATE OF CORRECTION

Page 2 of 3

PATENT NO. : 5,604,968
DATED : February 25, 1997
INVENTOR(S) : D. J. Fulbright & W. J. Smith It is certified that error appears in the above-indentified patent and that said Letters Patent is hereby corrected as shown below:

Col. 21, lines 57-61, Claim 3 delete "m. after application of the relative axial force of said second magnitude applying a rotary force for threading said gripping member further onto said pull groove portion while inhibiting application of the relative axial force of first magnitude,".

Col. 21, line 62, Claim 3 after "," insert --after said gripping member has been threaded further onto said pull portion applying a relative axial force between said gripping member and said swage anvil of said first magnitude thereby swaging said collar into said locking grooves.--

Col. 21, line 63, Claim 3 delete "n.".

Col. 22, line 50 Claim 4 delete "." and add --, and for the first installation step automatically applying the relative axial force of the first magnitude if a preselected maximum extent greater than said predetermined minimum extent is detected.--

Col. 23, line 15, Claim 6 "groove" should be --grooves--.

Col. 23, line 31, Claim 6 delete "." and insert --, thereby swaging said collar into said locking grooves.--.

Col. 23, line 40, Claim 8 "or" should be --for--.

Col. 23, line 65, Claim 8 "an" should be --and--.

UNITED STATES PATENT AND TRADEMARK OFFICE
CERTIFICATE OF CORRECTION

PATENT NO. : 5,604,968
DATED : February 25, 1997
INVENTOR(S) : D. J. Fulbright & W. J. Smith It is certified that error appears in the above-indentified patent and that said Letters Patent is hereby corrected as shown below:

Col. 26, line 33, Claim 18 delete "workplace" and substitute --workpiece--.

Col. 26, line 42, Claim 18 delete "workplace" and substitute --workpiece--.

Signed and Sealed this

Eleventh Day of November, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,604,968
DATED : February 25, 1997
INVENTOR(S) : David J. Fulbright et al.

It is certified that error appears in the above-identified patent and that said Letters Patent is hereby corrected as shown below:

Column 21,
Line 56, after ",", delete "after application of the relative axial force of said second magnitude applying a rotary force thereby threading said gripping member further onto said pull groove portion while inhibiting application of the relative axial force of first magnitude," (as inserted by Certificate of Correction issued November 11, 1997).

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.   : 5,604,968
DATED        : February 25, 1997
INVENTOR(S)  : Fulbright et al.

It is certified that error appears in the above-identified patent and that said Letters Patent is hereby corrected as shown below:

Column 21,
Line 56, after "," insert -- after application of the relative axial force of said second magnitude applying a rotary force thereby threading said gripping member further onto said pull groove portion while inhibiting application of the relative axial force of first magnitude, after said gripping member has been threaded further onto said pull portion applying a relative axial force between said gripping member and said swage anvil of said first magnitude, thereby swaging said collar into said locking grooves --.
Lines 57-61, delete "m. after application of the relative axial force of said second magnitude applying a rotary force for threading said gripping member further onto said pull groove portion while inhibiting application of the relative axial force of first magnitude,".
Lines 62-66, delete "n. after said gripping member has been threaded further onto said pull portion applying a relative axial force between said gripping member and said swage anvil of said first magnitude, thereby swaging said collar into said locking grooves"

Column 22,
Line 23, "a" first occurrence should be -- at --.
Line 29, "hereby" should be -- thereby --.
Line 50, delete "." and add --, and for the first installation step automatically applying the relative axial force of the first magnitude if a preselected maximum extent greater than said predetermined minimum extent is detected --.

Column 23,
Line 15, "groove" should be -- grooves --.
Line 31, delete "." and insert -- , thereby swaging said collar into said locking grooves. --.
Line 40, "or" should be -- for --.
Line 52, "workplace" should be -- workpiece --.
Line 65, "an" should be -- and --.

Column 25,
Line 44, delete "and".

UNITED STATES PATENT AND TRADEMARK OFFICE
CERTIFICATE OF CORRECTION

PATENT NO. : 5,604,968
DATED : February 25, 1997
INVENTOR(S) : Fulbright et al.

It is certified that error appears in the above-identified patent and that said Letters Patent is hereby corrected as shown below:

Column 26,
Lines 33 and 42, delete "workplace" and substitute -- workpiece --.

Signed and Sealed this

Twenty-sixth Day of April, 2005

JON W. DUDAS
*Director of the United States Patent and Trademark Office*